(12) United States Patent
Sedlak et al.

(10) Patent No.: US 9,222,483 B2
(45) Date of Patent: Dec. 29, 2015

(54) HEAT PUMP

(75) Inventors: Holger Sedlak, Lochhofen/Sauerlach (DE); Oliver Kniffler, Munich (DE)

(73) Assignee: Efficient Energy GmbH, Sauerlach (DE)

( * ) Notice: Subject to any disclaimer, the term of this patent is extended or adjusted under 35 U.S.C. 154(b) by 1283 days.

(21) Appl. No.: 12/910,062

(22) Filed: Oct. 22, 2010

(65) Prior Publication Data

US 2011/0036100 A1    Feb. 17, 2011

Related U.S. Application Data

(62) Division of application No. 11/695,515, filed on Apr. 2, 2007, now Pat. No. 7,841,201.

(60) Provisional application No. 60/789,324, filed on Apr. 4, 2006.

(30) Foreign Application Priority Data

Apr. 4, 2006  (EP) ................................ 2006/003061

(51) Int. Cl.
*F25D 23/12* (2006.01)
*F04D 29/28* (2006.01)
(Continued)

(52) U.S. Cl.
CPC .............. *F04D 29/284* (2013.01); *F04D 29/30* (2013.01); *F25B 1/053* (2013.01); *F25B 1/10* (2013.01);
(Continued)

(58) Field of Classification Search
CPC ........ F25B 39/02; F25B 39/00; F28F 13/187; F28F 13/087; F28F 13/08; F28F 13/185
USPC ................ 62/324.4, 324.1, 434, 498, 504
See application file for complete search history.

(56) References Cited

U.S. PATENT DOCUMENTS 1,533,336 A * 4/1925 Pownall ........................... 62/326
2,860,493 A * 11/1958 Capps et al. ................. 62/238.1
(Continued)

FOREIGN PATENT DOCUMENTS

DE      373915      4/1923
DE     4431887      9/1994
(Continued)

OTHER PUBLICATIONS

Office Action, mailed Jan. 28, 2011, in related Japanese patent application No. 2009-503415, 8 pages (including translation).
(Continued)

*Primary Examiner* — Cheryl J Tyler
*Assistant Examiner* — Elizabeth Martin
(74) *Attorney, Agent, or Firm* — Michael A. Glenn; Perkins Coie LLP

(57) ABSTRACT

A heat pump has an evaporator for evaporating water as a working liquid so as to produce a working vapor, the evaporation taking place at an evaporation pressure of less than 20 hPa. The working vapor is compressed to a working pressure of at least 25 hPa by a dynamic-type compressor so as to then be liquefied within a liquefier by direct contact with liquefier water. The heat pump is preferably an open system, wherein water present in the environment in the form of ground water, sea water, river water, lake water or brine is evaporated, and wherein water which has been liquefied again is fed to the evaporator, to the soil or to a water treatment plant.

3 Claims, 11 Drawing Sheets

(51) Int. Cl.

| | | |
|---|---|---|
| *F04D 29/30* | (2006.01) | |
| *F25B 1/053* | (2006.01) | |
| *F25B 1/10* | (2006.01) | |
| *F25B 30/00* | (2006.01) | |
| *F25B 39/00* | (2006.01) | |
| *F25B 39/02* | (2006.01) | |
| *F25B 9/00* | (2006.01) | |
| *F25B 30/06* | (2006.01) | |
| *F28D 21/00* | (2006.01) | |
| *F28F 13/08* | (2006.01) | |
| *F28F 21/06* | (2006.01) | |

(52) U.S. Cl.
  CPC ............... F25B 30/00 (2013.01); F25B 39/00 (2013.01); F25B 39/02 (2013.01); *F25B 9/002* (2013.01); *F25B 30/06* (2013.01); *F28D 2021/007* (2013.01); *F28D 2021/0019* (2013.01); *F28D 2021/0071* (2013.01); *F28F 13/08* (2013.01); *F28F 21/06* (2013.01)

(56) References Cited

U.S. PATENT DOCUMENTS

| | | | |
|---|---|---|---|
| 3,312,063 A | | 4/1967 | Anderson |
| 3,648,768 A | | 3/1972 | Scholl |
| 4,003,213 A | | 1/1977 | Cox |
| 4,216,659 A | * | 8/1980 | French ........................... 62/186 |
| 4,371,034 A | * | 2/1983 | Yamada et al. ............... 165/108 |
| 4,383,892 A | | 5/1983 | Woods |
| 4,638,642 A | | 1/1987 | Tokuno |
| 4,653,287 A | | 3/1987 | Martin, Jr. |
| 4,759,693 A | | 7/1988 | Outzen |
| 4,831,836 A | | 5/1989 | Matsuoka |
| 5,054,548 A | * | 10/1991 | Zohler ........................... 165/133 |
| 5,363,674 A | | 11/1994 | Powell |
| 5,520,008 A | | 5/1996 | Ophir et al. |
| 6,397,621 B1 | | 6/2002 | Reynaud et al. |
| 6,830,654 B1 | | 12/2004 | Salmisuo |
| 2001/0013408 A1 | | 8/2001 | Lee et al. |
| 2002/0014088 A1 | | 2/2002 | Seki et al. |
| 2002/0088526 A1 | | 7/2002 | Lee |
| 2004/0194929 A1 | * | 10/2004 | Ippoushi et al. ......... 165/104.29 |

FOREIGN PATENT DOCUMENTS

| | | |
|---|---|---|
| DE | 19820818 | 12/1999 |
| DE | 102004001927 | 8/2005 |
| EP | 1380799 | 5/2003 |
| EP | 1394492 | 3/2004 |
| EP | 1439365 | 7/2004 |
| GB | 929790 | 7/1960 |
| GB | 2071294 | 3/1980 |
| GB | 2337795 | 5/1998 |
| JP | 60-147067 | 2/1985 |
| JP | 61-140788 | 6/1986 |
| JP | 06-257890 | 9/1994 |
| JP | 08-97338 | 4/1996 |
| JP | 2001-165514 | 6/2001 |
| JP | 2002-516960 | 6/2002 |
| JP | 2004-190928 | 7/2004 |
| JP | 2005-241204 | 9/2005 |
| WO | WO 94/29597 | 12/1994 |
| WO | WO99/61800 | 12/1999 |
| WO | 03072946 A1 | 9/2003 |

OTHER PUBLICATIONS

European Search Report, mailed May 17, 2011, in related European patent application No. EP11158786, 4 pages.

\* cited by examiner

| P[hPa] | 8 | 12 | 30 | 60 | 100 | 1000 |
|---|---|---|---|---|---|---|
| COMPR. TEMP. | 4°C | 12°C | 24°C | 36°C | 45°C | 100°C |

HEAT PUMP

CROSS REFERENCE TO RELATED APPLICATIONS

This application is a divisional of U.S. patent application Ser. No. 11/695,515, filed Apr. 2, 2007, now U.S. Pat. No. 7,841,201 which claims priority to U.S. Patent Application No. 60/789,324, filed on Apr. 4, 2006, and from International Patent Application No. PCT/EP2006/003061, also filed on Apr. 4, 2006, which are both incorporated herein by reference in their entirety.

BACKGROUND OF THE INVENTION

1. Technical Field

The present invention relates to heat pumps, and in particular to heat pumps which may be employed for heating buildings, and specifically for heating relatively small building units, such as detached houses, semi-detached houses or row houses.

2. Description of the Prior Art

FIG. 8 shows a known heat pump as is described in "Technische Thermodynamik", Theoretische Grundlagen and praktische Anwendungen, 14th revised edition, Hanser Verlag, 2005, pp. 278-279. The heat pump includes a closed cycle, within which a working substance, such as R 134a, circulates. Via a first heat exchanger 80 and the evaporator, so much heat is withdrawn from the soil, or the ground water, that the working substance evaporates. The working substance, which now is rich in energy, is extracted by the compressor via the suction line. Within the compressor 81, it is/it will be compressed, thus increasing pressure and temperature. This compression is performed by a piston compressor. The working substance, which has been compressed and exhibits a high temperature, now passes into the second heat exchanger 82, the liquefier. Within the liquefier, so much heat is withdrawn from the working substance by the heating or process-water cycle that the coolant, being subject to high pressure and high temperature, is liquefied. Within the choke or expansion member 83, the working substance is expanded, i.e. the working substance is relieved of stress. Here, pressure and temperature are reduced to such an extent that the working substance is again able to re-absorb energy from the soil or the ground water within the evaporator. Now the cycle is complete and starts again.

As can be seen from this, the working substance serves as an energy transporter so as to take up heat from the soil or ground water, and to give it off, within the liquefier, to the heating cycle. In this process management, the 2nd law of thermodynamics is complied with, said law stating that heat or energy only be transferred, "on its own", can from a higher temperature level to a lower temperature level, and that inversely this may also occur by means of energy supply from outside, here by the driving work of the compressor.

FIG. 7 shows a typical h, log p diagram (h is the enthalpy, p the pressure of a material). An isobaric evaporation of the working substance takes place, between point 4 and point 1 in the diagram of FIG. 7, at low values for the pressure and the temperature (p1, T1). Here, the heat Q81 is supplied.

Ideally, a reversible compression of the working substance vapor to a pressure of p2 is performed, between point 1 and point 2, within an adiabatic compressor. The temperature rises to T2 in the process. A work of compression is to be supplied here.

Then, isobaric cooling of the working substance vapor from 2 to 2' is performed at a high pressure p2. Overheating is reduced. Subsequently, the working substance is liquefied. Overall, the heat Q25 can be dissipated.

Within choke 83, the working substance is choked, in an adiabatic manner, from the high pressure p2 to the low pressure p1. In the process, part of the liquid working substance evaporates, and the temperature falls to the evaporating temperature T1. In the h, log p diagram, the energies and characteristics of this process may be calculated by means of enthalpies, and may be illustrated, as is shown in FIG. 7.

The working fluid of the heat pump thus takes up, within the evaporator, heat from the surroundings, i.e. air, water, waste water or the soil. The liquefier serves as a heat exchanger for heating up a heating substance. Temperature T1 is slightly lower than the ambient temperature, temperature T2 is considerably higher and temperature T2' slightly higher than the heating temperature necessary. The higher the temperature difference called for, the more work must be effected by the compressor. Therefore, it is desired to keep the rise in temperature as small as possible.

Thus, with regard to FIG. 7, a compression of the working material vapors is performed, in the ideal case, along the curve for the entropy s=constant up to point 2. From here up to point 3, the working material liquefies. The length of the distance 2-3 represents the useful heat Q. From point 3 to point 4, the working material is expanded, and from point 4 to point 1, it is evaporated, the distance 4-1 reflecting the heat withdrawn from the heat source. Unlike the T, s diagram, the magnitudes of the heat and of the work may be taken as distances in the h, log p diagram. Pressure losses within valves, within the pressure and suction lines, of the compressor, etc. change the ideal curve of the cyclic process in the h, log p diagram and reduce the effectiveness of the entire process.

With piston compressors, the working material vapor which has been sucked in initially has a lower temperature than the cylinder wall of the compressor, and thus absorbs heat from it. As the compression increases, the temperature of the working material vapor eventually increases to exceed that of the cylinder wall, so that the working material vapor gives off heat to the cylinder wall. Then, when the piston again sucks in and compresses vapor, the temperature of the piston wall is initially fallen below again and then exceeded, which leads to constant losses. In addition, overheating of the working material vapor which has been sucked in will be called for and necessary for the compressor to no longer suck in any liquid working material. What is also disadvantageous, in particular, is the heat exchange with the oil cycle of the piston compressor, which is indispensable for lubrication.

Any irreversible processes, such as heat losses during compression, pressure losses within the valves, and flow losses within the pressure line for liquefying and within the liquefier, will increase the entropy, i.e. the heat which cannot be retrieved. In addition, temperature T2, also exceeds the liquefying temperature. Such an "overheating enthalpy" is undesired, in particular because the high temperatures occurring in the process will accelerate the aging of the compressor and, in particular, of the lubricating oil within a piston compressor. Also, the effectiveness of the process is reduced.

The liquefied working material at a low temperature at the output of the liquefier would have to be expanded, within the context of an ideal cyclic process, via an engine, for example a turbine, so as to exploit the excess energy which was present in comparison with the state present at the temperature and the pressure prior to compressing. Because of the great expenditure necessary for this, this measure is dispensed with, and the pressure of the working material is abruptly reduced to the low pressure and the low temperature by the choke 83. The enthalpy of the working material remains approximately the same in the process. Due to the abrupt pressure reduction, the working material must partially evaporate to reduce its temperature. The evaporation heat necessary is derived from the working material exhibiting excess temperature, i.e. is not withdrawn from the heat source. The entirety of the losses caused by the expansion within choke 83 (FIG. 8) is referred to as expansion losses. These are exergy losses because heat of a temperature T is converted to heat of a temperature T0. These losses may be reduced if the liquid working material can dissipate its heat to a medium having a temperature smaller than T. This undercooling enthalpy may be exploited by an internal heat exchange which, however, also necessitates additional expenditure in terms of equipment. Also in principle, the internal heat exchange has its limitation, because in the compression of the vapors, the overheating temperature T2 increases, whereby the gains achieved are partly cancelled out, and because also more thermal strain is put on the machine and the lubricating oil. Eventually, the overheating causes the volume of the vapor to increase, whereby the volumetric heat power decreases. This heat is utilized for preheating those vapors of the working material which flow to the compressor, only to the extent necessary for being sure that all droplets contained in the vapor of the working medium are converted to vapor.

In general, one may state that the ratio of the enthalpy difference between point 1 and point 4 and the enthalpy difference between point 2 and point 1 of the h, log p diagram is a measure of the economic efficiency of the heat pump process.

A working substance which is currently popular is R134a, the chemical formula of which is CF3-CH2F. It is a working substance which, even though it is no longer damaging to the ozone layer, nevertheless has an impact, in terms of the greenhouse effect, which is 1000 times higher than that of carbon dioxide. However, the working substance R134a is popular since it has a relatively large enthalpy difference of about 150 kJ/kg.

Even though this working substance is no longer an "ozone killer", there are nevertheless considerable requirements placed upon the completeness of the heat pump cycle, to the effect that no molecules of the working substance will escape from this closed cycle, since they would cause considerable damage due to the greenhouse effect. This encapsulation leads to considerable additional cost when building a heat pump.

Also, one must assume that by the time the next stage of the Kyoto Protocol is implemented, R134a will be prohibited by the year 2015 because of the greenhouse effect, which has also happened to previous, considerably more damaging substances.

What is therefore disadvantageous about existing heat pumps, beside the fact of the harmful working substance, is also the fact that, due to the many losses within the heat pump cycle, the efficiency factor of the heat pump typically does not exceed a factor of 3. In other words, 2 times the energy that has been used for the compressor may be withdrawn from the heat source, such as the ground water or the soil. When considering heat pumps wherein the compressor is driven by electrical current, and when considering, at the same time, that the efficiency factor in current generation is perhaps 40%, one will find that—with regard to the overall energy balance—the use of a heat pump is very questionable. In relation to the source of primary energy, 120%=3 □ 40% of heat energy are provided. A conventional heating system using a burner achieves efficiency factors of at least 90-95%, i.e. an improvement of only 25-30% is achieved at high technical and, therefore, financial expense.

Improved systems use primary energy for driving the compressor. Thus, gas or oil is burned to provide the compressor rating using the energy released by combustion. What is advantageous about this solution is the fact that the energy balance actually becomes more positive. The reason for this is that even though only about 30% of the source of primary energy may be used as driving energy, the waste heat of, in this case, about 70% can also be used for heating. The heating energy provided will then amount to 160%=3 □ 30%+70% of the source of primary energy. What is disadvantageous about this solution, however, is that a household will nevertheless necessitate a combustion engine and a fuel store even though it has no longer a classical heating system. The expenditure made for engine and fuel storage must be added to the expense made for the heat pump, which, after all, is a highly closed cycle due to the coolant being harmful to the climate.

All of these things have resulted in that heat pumps have had only limited success in competition with other types of heating systems.

SUMMARY OF THE INVENTION

According to an embodiment, a heat pump may have: an evaporator for evaporating water as a working liquid to generate a working vapor, the evaporator having an evaporation chamber and being configured to generate an evaporation pressure of less than 20 hPa within the evaporation chamber, so that the water will evaporate at temperatures below 18° C.; a compressor coupled to the evaporator for compressing the working vapor, the compressor being configured as a dynamic-type compressor and further being configured to compress the working vapor to a working pressure of more than 5 hPa above the evaporation pressure; and a liquefier for liquefying a compressed working vapor, the liquefier being configured to output a heat which has been obtained during the liquefaction to a heating system.

According to another embodiment, an evaporator apparatus for a heat pump may have: a water evaporator for evaporating water as a working liquid to generate a working vapor, the evaporator having an evaporation chamber and being configured to generate an evaporation pressure of less than 20 hPa within the evaporation chamber, so that the water will evaporate at temperatures below 18° C.

According to another embodiment, a compressor/liquefier system for a heat pump having an evaporator for evaporating water as a working liquid so as to generate a working vapor having an evaporation pressure may have: a compressor coupled to the evaporator for compressing the working vapor, the compressor being configured as a dynamic-type compressor and further being configured to compress the working vapor to a working pressure of more than 5 hPa above the evaporation pressure; and a liquefier for liquefying a compressed working vapor, the liquefier being configured to output a heat which has been obtained during the liquefaction to a heating system.

According to another embodiment, a method of pumping heat may have the steps of: evaporating water as a working liquid to generate a working vapor, the working vapor being generated at an evaporation pressure of less than 20 hPa, so that the water will evaporate at temperatures below 18° C.; compressing the working vapor in terms of flow so as to compress the working vapor to a working pressure of more than 5 hPa above the evaporation pressure; and liquefying a compressed working vapor to output a heat which has been obtained during the liquefaction to a heating system.

According to another embodiment, a method of evaporating water within a heat pump may have the steps of: evaporating water as a working liquid to generate a working vapor, the working vapor being generated at an evaporation pressure of less than 20 hPa, so that the water will evaporate at temperatures below 18° C.

According to another embodiment, a method of compressing and liquefying for a heat pump having an evaporator for evaporating water as a working liquid to produce a working vapor with an evaporation pressure may have the steps of: compressing the working vapor in terms of flow so as to compress the working vapor to a working pressure of more than 5 hPa above the evaporation pressure; and liquefying a compressed working vapor to output a heat which has been obtained during the liquefaction to a heating system.

According to another embodiment, a computer program may have a program code for performing the method of pumping heat, the method having the steps of: evaporating water as a working liquid to generate a working vapor, the working vapor being generated at an evaporation pressure of less than 20 hPa, so that the water will evaporate at temperatures below 18° C.; compressing the working vapor in terms of flow so as to compress the working vapor to a working pressure of more than 5 hPa above the evaporation pressure; and liquefying a compressed working vapor to output a heat which has been obtained during the liquefaction to a heating system, when the computer program runs on an arithmetic-logic unit.

According to another embodiment, a computer program may have a program code for performing the method of pumping heat, the method having the steps of: evaporating water as a working liquid to generate a working vapor, the working vapor being generated at an evaporation pressure of less than 20 hPa, so that the water will evaporate at temperatures below 18° C., when the computer program runs on an arithmetic-logic unit.

According to another embodiment, a computer program may have a program code for performing the method of compressing and liquefying for a heat pump having an evaporator for evaporating water as a working liquid to produce a working vapor with an evaporation pressure, the method having the steps of: compressing the working vapor in terms of flow so as to compress the working vapor to a working pressure of more than 5 hPa above the evaporation pressure; and liquefying a compressed working vapor to output a heat which has been obtained during the liquefaction to a heating system, when the computer program runs on an arithmetic-logic unit.

The present invention is based on the realization that one must get away from working substances which are detrimental to the climate, and that normal water is an optimum working substance instead. In comparison with the working substance R134a, which is frequently used these days, water additionally has a considerably larger ratio of the enthalpy differences. The enthalpy difference, which is decisive in terms of how effective the heat pump process is, amounts to about 2500 kJ/kg for water, which is about 16 times as much as the usable enthalpy difference of R134a. The compressor enthalpy to be expended, by contrast, is only 4-6 times as large, depending on the operating point.

In addition, water is not harmful to the climate, i.e. is neither an ozone killer, not does it aggravate the greenhouse effect. This enables heat pumps to be built in a considerably simpler manner, since the requirements placed upon the completeness of the cycle are not high. Instead, it is even preferred to completely leave behind the closed process and to make an open process instead, wherein the ground water, or the water representing the exterior heat source, is directly evaporated.

In accordance with the invention, the evaporator is configured such that it comprises an evaporation chamber within which the evaporation pressure is lower than 20 hPa (hectopascal), so that water will evaporate at temperatures below 18° C. and, preferably, below 15° C. In the northern hemisphere, typical ground water has temperatures of between 8 and 12° C., which necessitates pressures of below 20 hPa for the ground water to evaporate, so as to be able to achieve, by evaporating the ground water, a reduction in the temperature of the ground water and, thus, heat removal, by means of which a heating system within a building, such as a floor heating system, may be operated.

In addition, water is advantageous in that water vapor takes up a very large volume, and in that it is no longer necessary to fall back on a displacement machine such as a piston pump or the like in order to compress the water vapor, but that a high-performance compressor in the form of a dynamic-type compressor, such as a radial-flow compressor, may be employed which is highly controllable in terms of its technology and is cost-efficient in terms of its production since it exists in high quantities and has been used up to now as a small turbine or as a turbocompressor in cars, for example.

A prominent representative of the pedigree of dynamic-type compressors as compared to displacement machines is the radial-flow compressor, for example in the form of a turbocompressor comprising a radial-flow wheel.

The radial-flow compressor, or the dynamic-type compressor, must achieve at least such a level of compression that the output pressure exiting from the radial-flow compressor is at least 5 hPa higher than the input pressure into the radial-flow compressor. Preferably, however, a compression will have a ratio larger than 1:2, and even larger than 1:3.

Compared to piston compressors, which are typically employed within closed cycles, dynamic-type compressors additionally have the advantage that the compressor losses are highly reduced, due to the temperature gradient existing within the dynamic-type compressor, as compared with a displacement machine (piston compressor), wherein such a stationary temperature gradient does not exist. What is particularly advantageous is that an oil cycle is completely dispensed with.

Moreover, particular preference is given to multi-stage dynamic-type compressors to achieve the relatively high level of compression which should have a factor of 8 to 10 in order to achieve sufficient advance flow temperature in a heating system even for cold winter days.

In a preferred embodiment, a fully open cycle is employed, wherein the ground water is made to have the low pressure. A preferred embodiment for generating a pressure below 20 hPa for ground water consists in the simple use of a riser pipe leading to a pressure-tight evaporation chamber. If the riser pipe overcomes a height of between 9 and 10 m, the evaporation chamber will comprise the low pressure necessary at which the ground water will evaporate at a temperature of between 7 and 12° C. Since typical buildings are at least 6 to 8 m in height and since in many regions, the ground water is present already at 2 to 4 m below the surface of the earth, installing such a pipe leads to no considerable additional expense since it is only necessary to dig a little deeper than for the foundations of the house, and since typical heights of buildings are readily high enough for the riser pipe or the evaporation chamber not to protrude above the building.

For cases of application wherein only a shorter riser pipe is possible, the length of the riser pipe may be readily reduced by a pump/turbine combination which only necessitates a minor amount of additional work from the outside due to the fact that the turbine is used for converting the high pressure to the low pressure, and the pump is used for converting the low pressure to the high pressure.

Thus, primary heat-exchanger losses are eliminated, since no primary heat exchanger is used but use is made of the evaporated ground water directly as a working vapor or a working substance.

In a preferred embodiment, no heat exchanger is used even in the liquefier. Instead, the water vapor which is heated up due to being compressed is directly fed into the heating-system water within a liquefier, so that within the water, a liquefaction of the water vapor takes place such that even secondary heat-exchanger losses are eliminated.

The inventive water evaporator/dynamic-type compressor/liquefier combination thus enables efficiency factors of at least 6 in comparison with common heat pumps. Thus, it is possible to withdraw from the ground water at least 5 times the amount of the electric energy spent for compression, so that a heating energy of 240%=6 ☐ 40%, in relation to the source of primary energy, is provided even if the dynamic-type compressor is operated with electrical current. As compared with the art, this represents at least double the efficiency or half of the energy costs. This is particularly true for the emission of carbon dioxide, which is relevant in terms of the climate.

BRIEF DESCRIPTION OF THE DRAWINGS

Embodiments of the present invention will be detailed subsequently referring to the appended drawings, in which.

DETAILED DESCRIPTION OF THE INVENTION

Figures 1A, 1B:
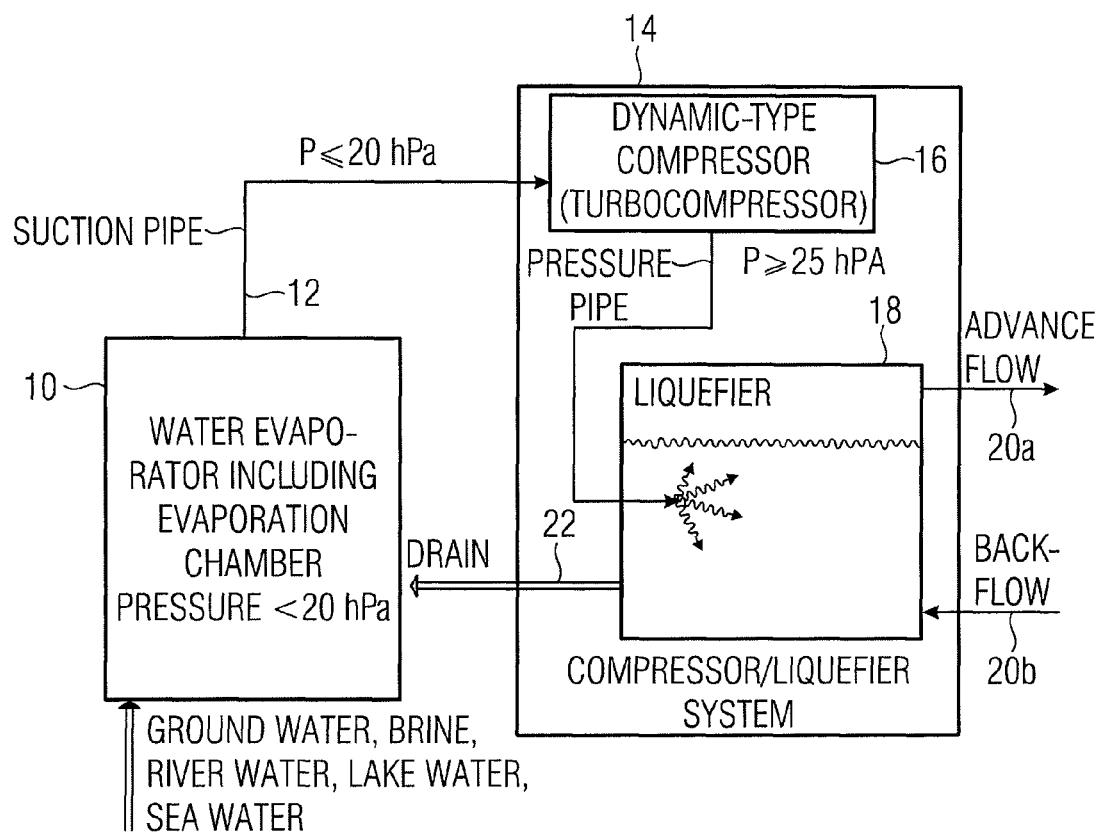
FIG. 1a is a basic block diagram of the inventive heat pump.
FIG. 1b is a table for illustrating various pressures and the evaporation temperatures associated with these pressures.

FIG. 1a shows an inventive heat pump which initially comprises a water evaporator 10 for evaporating water as a working fluid so as to generate, on the output side, a vapor within a working vapor line 12. The evaporator includes an evaporation chamber (not shown in FIG. 1a) and is configured to generate, within the evaporation chamber, an evaporation pressure lower than 20 hPa, so that the water will evaporate within the evaporation chamber at temperatures below 15° C. The water is preferably ground water, brine circulating freely within the soil or within collector pipes, i.e. water with a specific salt content, river water, lake water or sea water. In accordance with the invention, all types of water, i.e. limy water, non-limy water, saline water or non-saline water, are preferably used. This is due to the fact that all types of water, i.e. all of these "water materials", have the favorable property of water, i.e. consisting in that water, also known as "R 718", has an enthalpy-difference ratio of 6 usable for the heat pump process, which corresponds to more than double a typically usable enthalpy-difference ratio of, e.g., R134a.

The water vapor is fed, by suction line 12, to a compressor/liquefier system 14 comprising a dynamic-type compressor, such as a radial-flow compressor, for example in the form of a turbocompressor designated by 16 in FIG. 1a. The dynamic-type compressor is configured to compress the working vapor to a vapor pressure of at least more than 25 hPa. 25 hPa correspond to a liquefying temperature of about 22° C., which may already be a sufficient heating-system advance flow temperature of a floor heating system, at least on relatively warm days. In order to generate higher advance flow temperatures, pressures of more than 30 hPa may be generated using dynamic-type compressor 16, a pressure of 30 hPa having a liquefying temperature of 24° C., a pressure of 60 hPa having a liquefying temperature of 36° C., and a pressure of 100 hPa corresponding to a liquefying temperature of 45° C. Floor heating systems are designed to be able to provide sufficient heating with an advance flow temperature of 45° C. even on very cold days.

The dynamic-type compressor is coupled to a liquefier 18 which is configured to liquefy the compressed working vapor. By the liquefaction, the energy contained within the working vapor is fed to the liquefier 18 so as to be fed to a heating system via the advance flow 20a. Via backflow 20b, the working fluid flows back into the liquefier.

In accordance with the invention, it is preferred to extract the heat (heat energy) from the high-energy water vapor directly by the colder heating water, said heat (heat energy) being taken up by the heating-system water so that the latter heats up. In the process, so much energy is extracted from the vapor that same becomes liquefied and also participates in the heating cycle.

Thus, a loading of material into the liquefier, or the heating system, takes place, the loading being regulated by a drain 22, such that the liquefier in its liquefaction chamber has a water level which remains below a maximum level despite the constant supply of water vapor and, thereby, of condensate.

As has already been explained, it is preferred to take an open cycle, i.e. to evaporate the water, which represents the heat source, directly without a heat exchanger. Alternatively, however, the water to be evaporated could also initially be heated up by an external heat source via a heat exchanger. However, what is to be taken into account in this context is that this heat exchanger again signifies losses and expenditure in terms of apparatus.

In addition, it is preferred, in order to avoid losses for the second heat exchanger which has been necessarily present so far on the liquefier side, to use the medium directly even there, i.e. to let the water, which comes from the evaporator, circulate directly within the floor heating system, when considering a house comprising a floor heating system.

Alternatively, however, a heat exchanger may be arranged, on the liquefier side, which is fed with the advance flow 20a and which comprises the backflow 20b, this heat exchanger cooling the water present within the liquefier, and thus heating up a separate floor heating liquid which will typically be water.

Due to the fact that the working medium used is water, and due to the fact that only the evaporated portion of the ground water is fed into the dynamic-type compressor, the degree of purity of the water is irrelevant. Just like the liquefier and, as the situation may be, the directly coupled floor heating system, the dynamic-type compressor is provided with distilled water such that, in comparison with present-day systems, the system has a reduced maintenance expenditure. In other words, the system is self-cleaning, since the system is only ever fed with distilled water, and since the water within the drain 22 is thus not contaminated.

In addition, it shall be noted that dynamic-type compressors have the properties that—similar to a turbine of an airplane—they do not contact the compressed medium with problematic materials such as oil. Instead, the water vapor is compressed only by the turbine or the turbocompressor, but is not contacted with oil or any other medium negatively affecting its purity, and thus is not contaminated.

The distilled water dissipated through the drain may thus be readily re-fed to the ground water—if no other regulations are in the way. Alternatively, however, it may also be made to seep away, e.g. in the garden or in an open area, or it may be fed to a waste water purification plant via the sewage system, if the regulations permit.

The inventive combination of water as a working substance with the useful enthalpy-difference ratio which is doubly improved as compared with R134a, and due to the consequently reduced requirements placed upon the closed nature of the system (rather, an open system is preferred) and due to the use of the dynamic-type compressor, by means of which the necessary compression factors are efficiently achieved without any negative effects on the purity, an efficient heat pump process which is neutral in terms of environmental damage is provided which will become even more efficient if the water vapor is directly liquefied within the liquefier, since, in this case, not one single heat exchanger will be necessary in the entire heat pump process.

In addition, any losses associated with the piston compression are dispensed with. In addition, the losses, which are very low in the case of water and which otherwise occur in the choking, may be used to improve the evaporation process, since the drain water having the drain temperature, which will typically be higher than the ground water temperature, is advantageously used to trigger a bubble evaporation within the evaporator by means of a structuring 206 of a drain pipe 204, as will be explained in FIG. 4a, in order to increase the evaporation efficiency.

A preferred embodiment of the present invention will be explained below in detail with reference to FIG. 2. The water evaporator comprises an evaporation chamber 100 and a riser pipe 102, wherein ground water from a ground water reservoir 104 moves upward into the evaporation chamber 100 in the direction of an arrow 106. The riser pipe 102 leads to an expander 108 configured to expand the relatively narrow pipe cross-section so as to provide as large an evaporation area as possible. The expander 108 will have the shape of a funnel, i.e. the shape of a rotation paraboloid of any configuration. It may have round or square transitions. The only thing that is critical is that the cross-section directed into the evaporation chamber 100, or the area facing the evaporation chamber 100, is larger than the cross-sectional area of the riser pipe so as to improve the evaporation process. If one assumes that about 1 l per second flows upward into the evaporation chamber through the riser pipe, about 4 ml per second are evaporated within the evaporator at a heating power of about 10 kW. The remainder exits, cooled by about 2.5° C., via the expander 108 and ends up in a containment collection basin 110 within the evaporation chamber. The containment collection basin 110 comprises a drain 112, within which the quantity of 1 l per second, minus the evaporated 4 ml per second, is dissipated again, preferably back to the ground water reservoir 104. For this purpose, a pump 114 or a valve for overflow control is provided. It shall be noted that no active pumping is to be performed, since, due to gravity, water will flow downward from the evaporator containment basin 110 into the ground water reservoir via a backflow pipe 113 if the pump of the valve 114 is opened. The pump or the valve 114 thus ensures that the water level within the containment basin does not rise to too high a level or that no water vapor enters into the drain pipe 112, and that the evaporation chamber is also securely decoupled from the situation at the "lower" end of the backflow pipe 113.

The riser pipe is arranged within a riser pipe basin 116 which is filled with water by a pump 118 which is preferably provided. The levels in 116 and 108 are connected to one another in accordance with the principle of the communicating pipes, gravity and the different pressures within 116 and 108 ensuring that the water is transported from 116 to 108. The water level present in the riser pipe basin 116 is preferably arranged such that, even with different air pressures, the level will never fall below the inlet of the riser pipe 102 so as to prevent air from entering.

Preferably, evaporator 10 comprises a gas separator configured to remove at least part, e.g. at least 50% of a gas dissolved in the water to be evaporated, from the water to be evaporated, so that the removed part of the gas will not be sucked in by the compressor via the evaporation chamber. Preferably, the gas separator is arranged to feed the removed part of the gas to a non-evaporated water so that the gas is transported off by the non-evaporated water. Dissolved gases may be oxygen, carbon dioxide, nitrogen, etc. These gases evaporate mostly at a higher pressure than water does, so that the gas separator may be arranged downstream from the expander 108, so that oxygen etc., which has been evaporated within the gas separator, will exit from the water which has just not been evaporated yet, and will preferably be fed into the return pipe 113. Feeding-in is preferably performed at that location of the return pipe 113 at which the pressure is so low that the gas is again taken along into the ground water by the back-flowing water. Alternatively, the separated gas may also be collected and be disposed of at specific intervals or be constantly vented, i.e. released to the atmosphere.

Typically, the ground water, sea water, river water, lake water, the brine or any other naturally occurring aqueous solution will have a temperature of between 8° C. and 12° C. By lowering the temperature of 1 l of water by 1° C., a power of 4.2 kW may be generated. If the water is cooled by 2.5° C., a power of 10.5 kW is generated. Preferably, a current of water with a current intensity depending on the heat power, in the example one liter per second, flows through the riser pipe.

If the heat pump works at a relatively high load, the evaporator will evaporate about 6 ml per second, which corresponds to a vapor volume of about 1.2 cubic meters per second. Depending on the heating-system water temperature called for, the dynamic-type compressor is controlled with regard to its compression power. If a heating advance flow temperature of 45° C. is desired, which is largely sufficient even for extremely cold days, the dynamic-type compressor will have to increase the pressure, which may have been generated at 10 hPa, to a pressure of 100 hPa. If, on the other hand, an advance flow temperature of, e.g., 25° is sufficient for the floor heating system, the compression that must be effected by the dynamic-type compressor only will have a factor of 3.

The power generated is thus determined by the compressor rating, i.e., on the one hand, by the compression factor, i.e. the degree to which the compressor compresses and, on the other hand, by the volume flow generated by the compressor. If the volume flow increases, the evaporator will have to evaporate more, the pump 118 transporting more ground water into the riser pipe basin 116, so that more ground water is fed to the evaporation chamber. On the other hand, if the dynamic-type compressor provides a lower compression factor, less ground water will flow from the bottom to the top.

However, it shall also be noted here that it is preferred to control the passage of ground water through the pump 118. According to the principle of the communicating pipes, the filling level within container 116, or the displacement capacity of the pump 118, establishes the amount of flow through the riser pipe. Therefore, an increase in the efficiency of the plant may be achieved, since the control of the flow is decoupled from the suction power of the dynamic-type compressor.

Figure 5A:
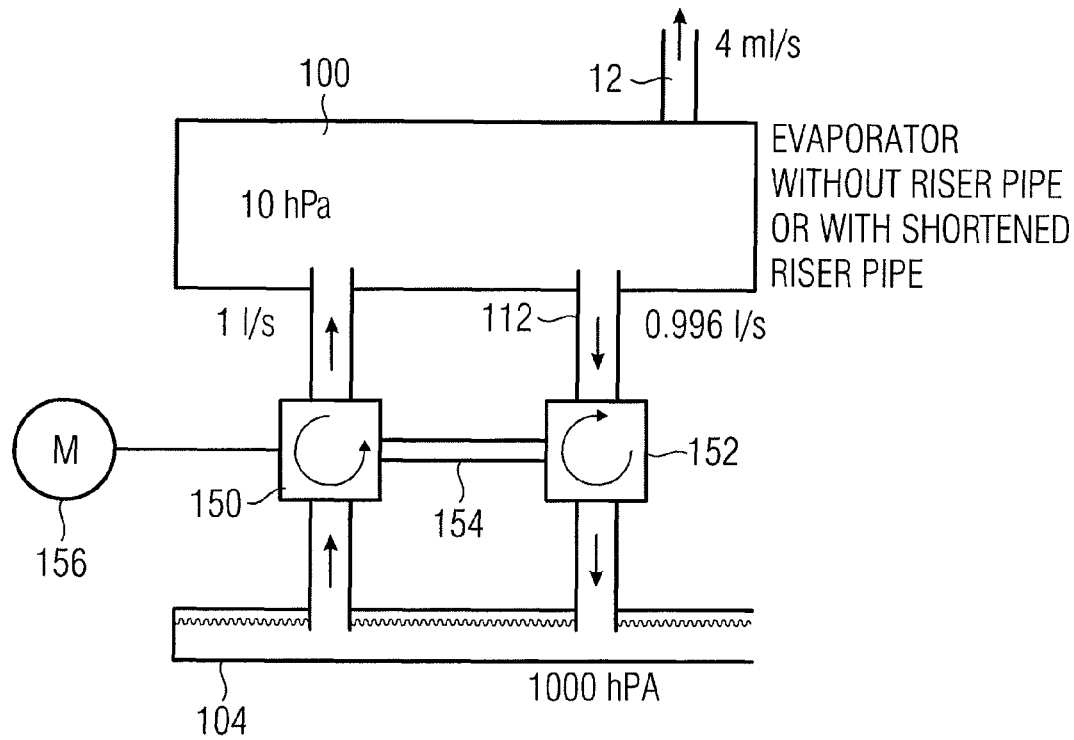
FIG. 5a is an alternative implementation of the evaporator for reducing the height of the riser pipe.

No pump is necessary for pumping the ground water from below into the evaporation chamber 100. Rather, this occurs "by itself". This automatic rise up to the evacuated evaporation chamber also assists the fact that the negative pressure of 20 hPa may be readily achieved. No evacuation pumps or the like are necessary for this purpose. Rather, only a riser pipe having a height of more than 9 m is necessary. Then a purely passive negative-pressure generation is achieved. However, the negative pressure necessary may also be generated using a considerably shorter riser pipe, for example when the implementation of FIG. 5a is employed. In FIG. 5a, a considerably shorter "riser pipe" is shown. Converting high pressure to the negative pressure is accomplished via a turbine 150, the turbine withdrawing energy from the working medium in this context. At the same time, the negative pressure on the backflow side is again returned to the high pressure, the energy necessary for this being supplied by a pump 152. The pump 152 and the turbine 150 are coupled to one another via a force coupling 154, so that the turbine drives the pump, specifically using the energy that the turbine has withdrawn from the medium. A motor 156 is merely still necessary for compensating for the losses which the system inevitably will have, and to achieve the circulation, i.e. to bring a system from its resting position into the dynamic mode depicted in FIG. 5a.

In the preferred embodiment, the dynamic-type compressor is configured as a radial-flow compressor with a rotatable wheel, it being possible for the wheel to be a slow-speed radial-flow wheel, a medium-speed radial-flow wheel, a half-axial flow wheel or an axial flow wheel, or a propeller, as are known in the art. Radial-flow compressors are described in "Strömungsmaschinen", C. Pfleiderer, H. Petermann, Springer-Verlag, 2005, pp. 82 and 83. Thus, such radial-flow compressors comprise, as the rotatable wheel, the so-called center runner, the form of which depends on the individual requirements. Generally, any dynamic-type compressors may be employed, as are known as turbocompressors, fans, blowers or turbocondensers.

Figure 6A:
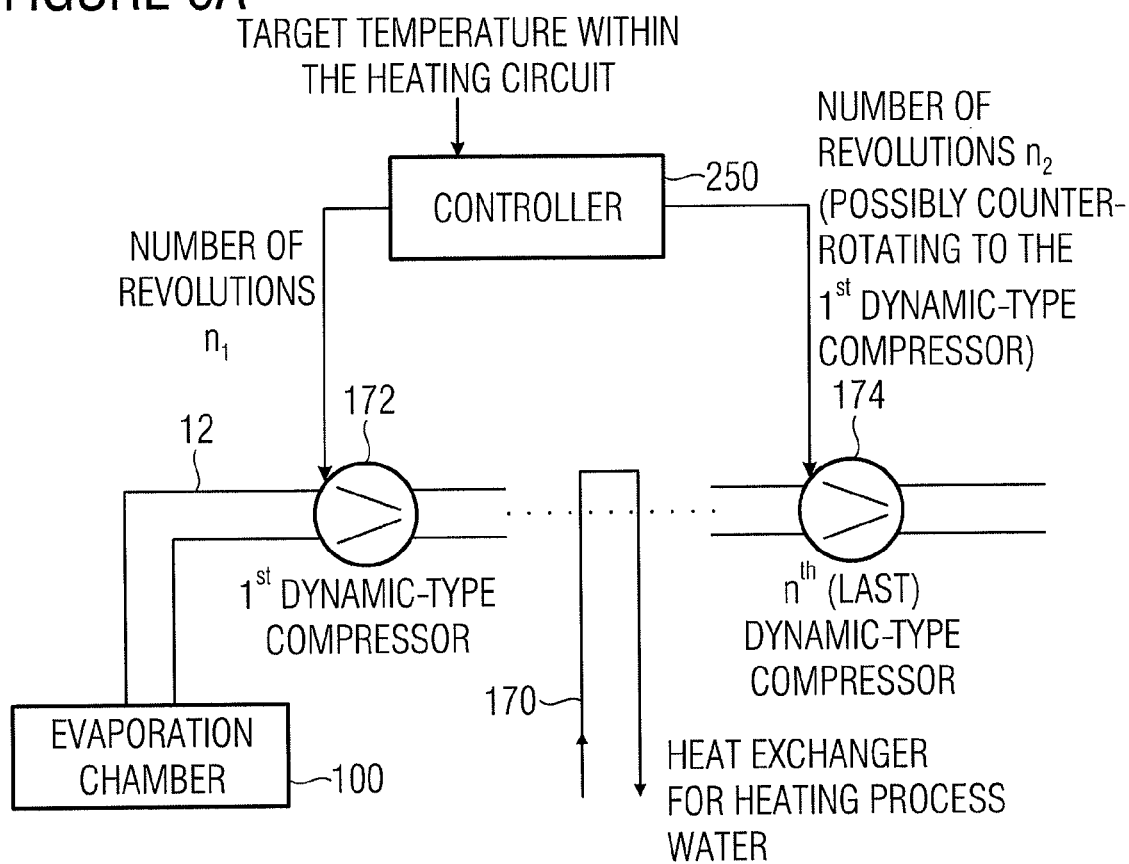
FIG. 6a is a schematic representation of the compressor performed by several dynamic-type compressors arranged one behind the other.

In the preferred embodiment of the present invention, radial-flow compressor 16 is configured as several independent dynamic-type compressors which may be controlled independently at least with regard to their number of revolutions, so that two dynamic-type compressors may have different numbers of revolutions. Such an implementation is depicted in FIG. 6a, wherein the compressor is configured as a cascade of n dynamic-type compressors. At various locations downstream from the first dynamic-type compressor, provision is preferably made of one or even more heat exchangers, for example for heating processed water, which are designated by 170. These heat exchangers are configured to cool the gas which has been heated up (and compressed) by a preceding dynamic-type compressor 172. Here, overheating enthalpy is sensibly exploited to increase the efficiency factor of the entire compression process. The cooled gas is then compressed further using one or several downstream compressors, or is directly fed to the liquefier. Heat is extracted from the compressed water vapor for heating, e.g., processed water to higher temperatures than, e.g., 40° C. However, this does not reduce the overall efficiency factor of the heat pump, but even increases it, since two successively connected dynamic-type compressors with gas cooling connected in between, having a longer useful life achieve the necessary gas pressure within the liquefier due to the reduced thermal load and while needing less energy than if a single dynamic-type compressor without gas cooling were present.

Figure 6B:
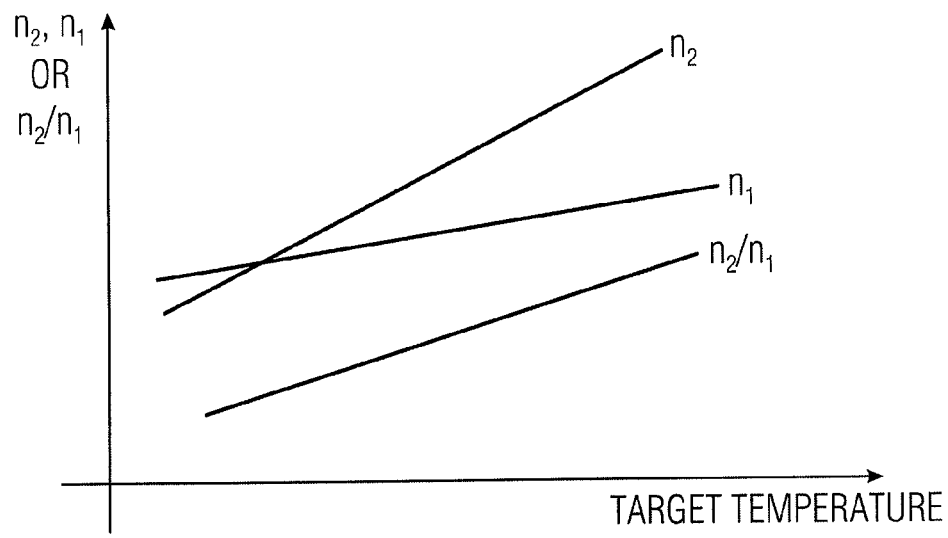
FIG. 6b is a schematic representation of the setting of the numbers of revolutions of two cascaded dynamic-type compressors as a function of the target temperature.

The cascaded dynamic-type compressors operated independently are preferably controlled by a controller 250 which maintains, on the input side, a target temperature within the heating circuit and, as the situation may be, also an actual temperature within the heating circuit. Depending on the target temperature desired, the number of revolutions of a dynamic-type compressor which is arranged upstream in the cascade and is referred to by n1, by way of example, and the number of revolutions n2 of a dynamic-type compressor which is arranged downstream in the cascade are changed such as is depicted by FIG. 6b. If a higher target temperature is input into the controller 250, both numbers of revolutions are increased. However, the number of revolutions of the dynamic-type compressor arranged upstream, which is referred to by n1 in FIG. 6b, is increased with a smaller gradient than the number of revolutions n2 of a dynamic-type compressor arranged downstream in the cascade. This results in that—when the ratio n2/n1 of the two numbers of revolutions is plotted—a straight line having a positive slope results in the diagram of FIG. 6b.

The point of intersection between the numbers of revolutions n1 and n2 which are individually plotted may occur at any point, i.e. at any target temperature, or may not occur, as the case may be. However, it is generally preferred to increase a dynamic-type compressor arranged closer to the liquefier within the cascade more highly, with regard to its number of revolutions, than a dynamic-type compressor arranged upstream in the cascade, should a higher target temperature be desired.

Figure 6C:
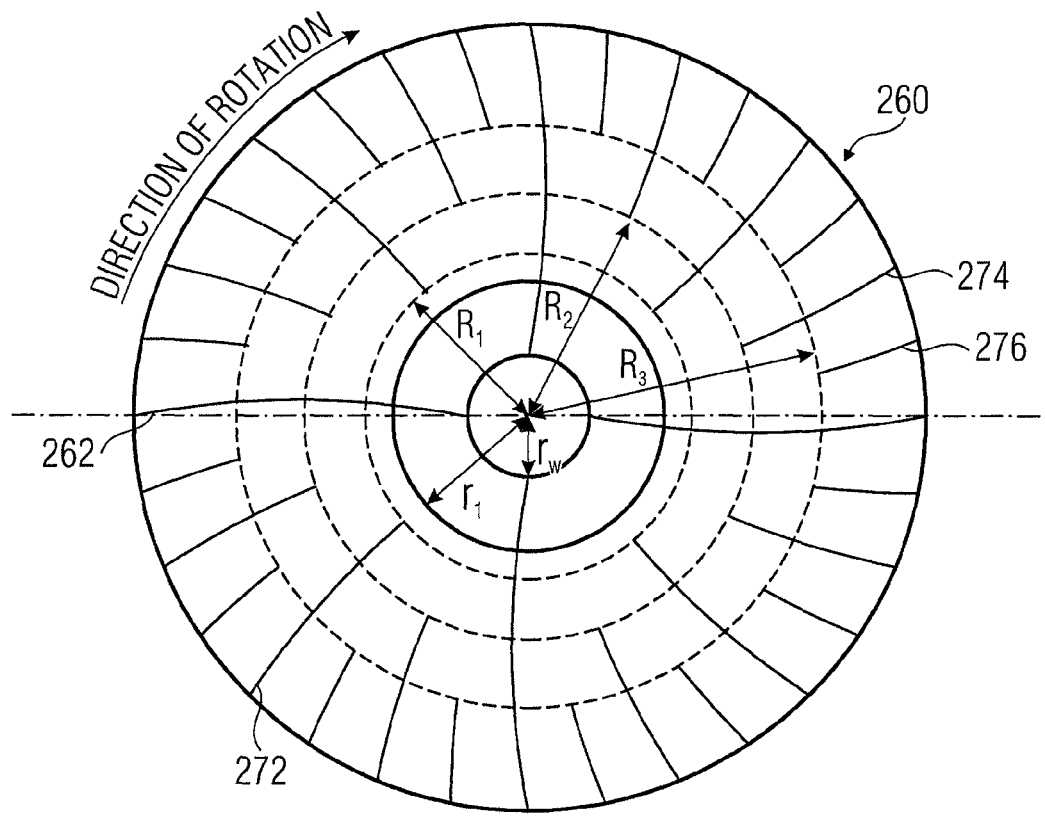
FIG. 6c is a schematic top view of a radial-flow wheel of a dynamic-type compressor in accordance with a preferred embodiment of the present invention.
Figure 6D:
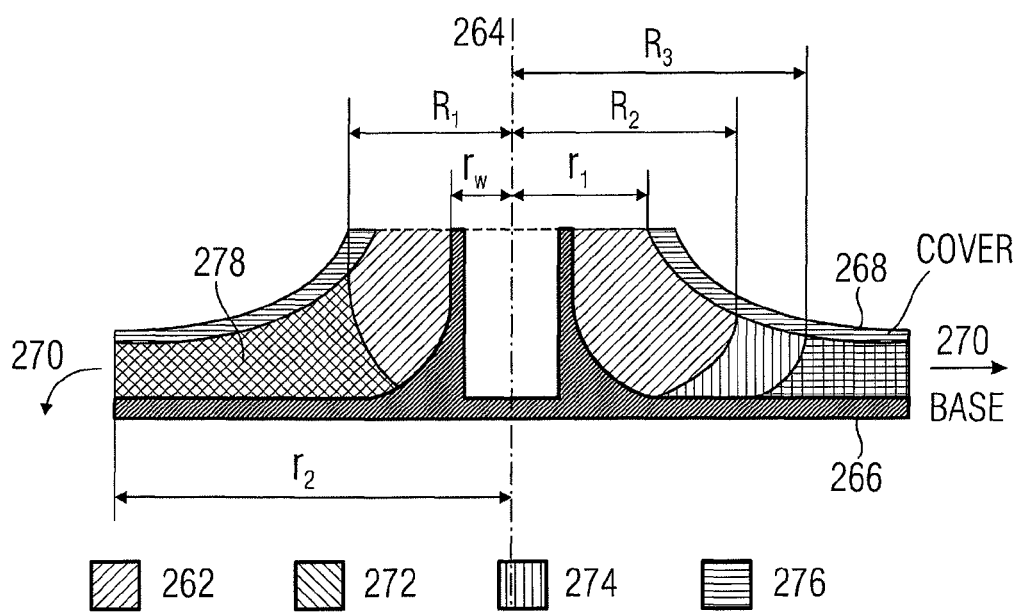
FIG. 6d is a schematic cross-sectional view with a merely schematical representation of the radial-wheel vanes for illustrating the different expansions of the vanes with regard to the radius of the radial-flow wheel.
Figure 7:
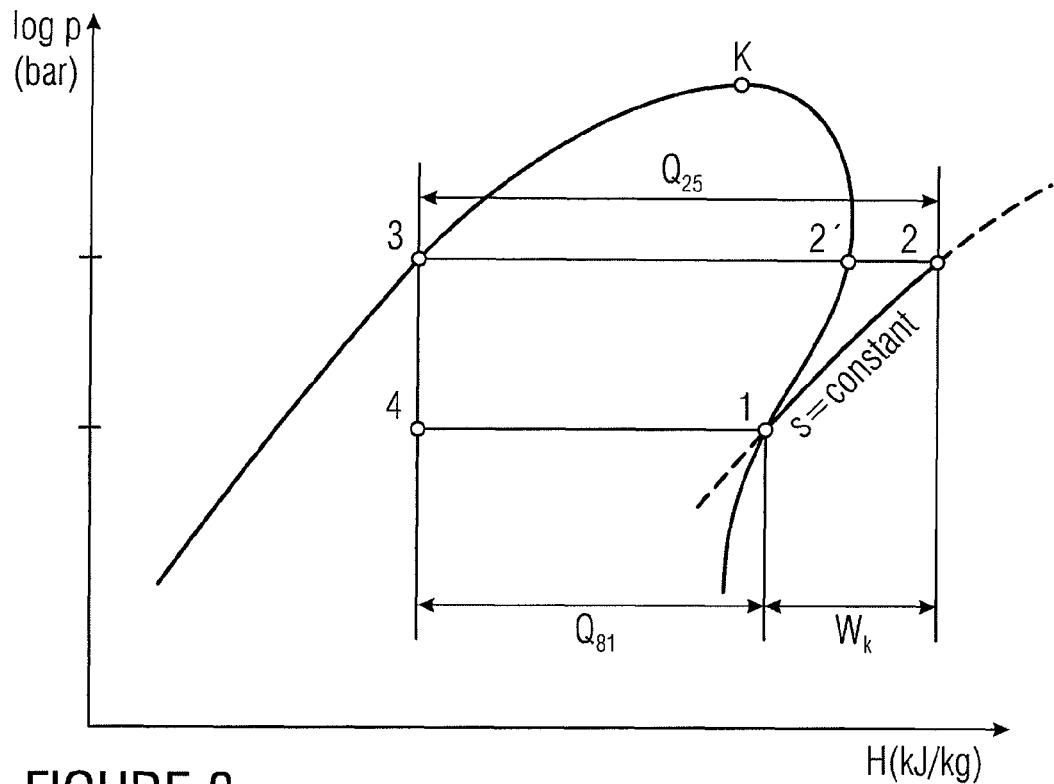
FIG. 7 is an exemplary h, log p diagram.
Figure 8:
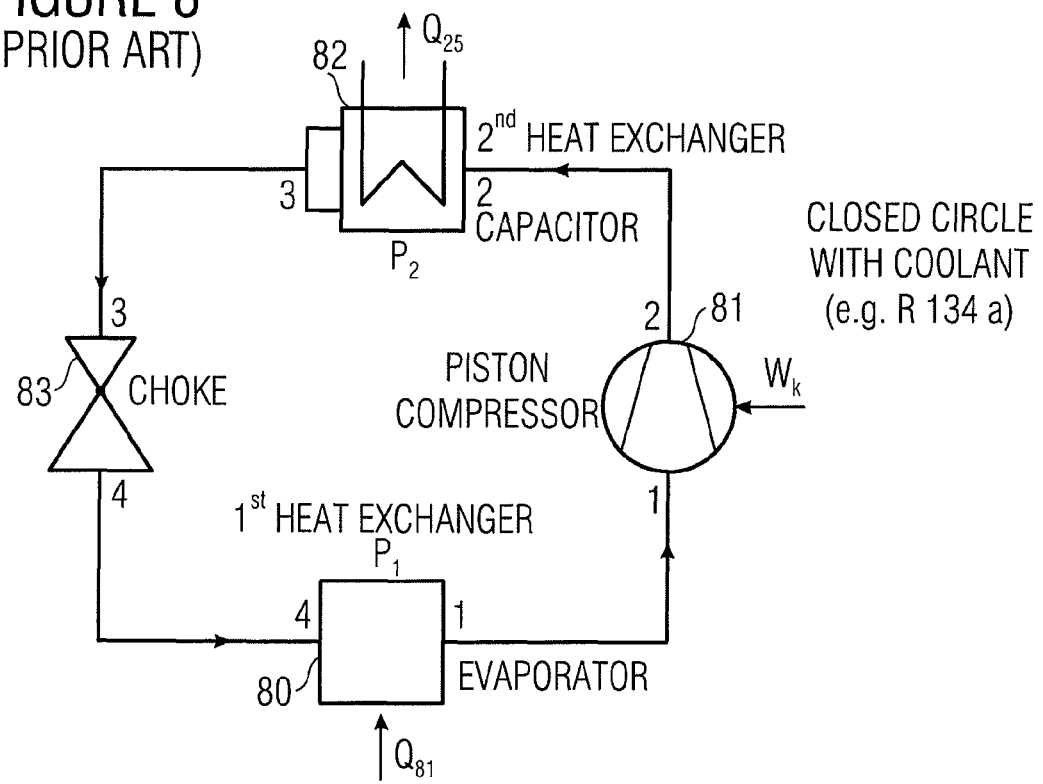
FIG. 8 is a known heat pump performing the left-handed cycle of FIG. 7.

The reason for this is that the dynamic-type compressor arranged downstream in the cascade must process further already compressed gas which has been compressed by a dynamic-type compressor arranged upstream in the cascade. In addition, this ensures that the vane angle of vanes of a radial-flow wheel, as is also discussed with reference to FIGS. 6c and 6d, is positioned as favorably as possible with regard to the speed of the gas to be compressed. Thus, the setting of the vane angle only consists in optimizing a compression of the in-flowing gas which is as low in eddies as possible. The further parameters of the angle setting, such as gas throughput and compression ratio, which otherwise would have enabled a technical compromise in the selection of the vane angle, and thus would have enabled an optimum efficiency factor at a target temperature only, are brought, in accordance with the invention, to the optimum operating point by the independent revolutions control, and therefore have no longer any influence on the selection of the vane angle. Thus, an optimum efficiency factor results despite an fixedly set vane angle.

In this regard, it is preferred, in addition, for a dynamic-type compressor which is arranged more in the direction of the liquefier within the cascade to have a rotational direction of the radial-flow wheel which is opposed to the rotational direction of the radial-flow wheel arranged upstream in the cascade. Thus, an almost optimum entry angle of the vanes of both axial flow wheels in the gas stream may be achieved, such that a favorable efficiency factor of the cascade of dynamic-type compressors occurs not only within a small target temperature range, but within a considerably broader target temperature range of between 20 and 50 degrees, which is an optimum range for typical heating applications. The inventive revolutions control and, as the case may be, the use of counter-rotating axial flow wheels thus provides an optimum match between the variable gas stream at a changing target temperature, on the one hand, and the fixed vane angles of the axial flow wheels, on the other hand.

In preferred embodiments of the present invention, at least one or preferably all of the axial flow wheels of all dynamic-type compressors are made of plastic having a tensile strength of more than 80 MPa. A preferred plastic for this purpose is polyamide 6.6 with inlaid carbon fibers. This plastic has the advantage of having a high tensile strength, so that axial flow wheels of the dynamic-type compressors may be produced from this plastic and may nevertheless be operated at high numbers of revolutions.

Preferably, axial flow wheels are employed in accordance with the invention, as are shown, for example, at reference numeral 260 in FIG. 6c. FIG. 6c depicts a schematic top view of such a radial-flow wheel, while FIG. 6d depicts a schematic cross-sectional view of such a radial-flow wheel. As is known in the art, a radial-flow wheel comprises several vanes 262 extending from the inside to the outside. The vanes fully extend toward the outside, with regard to axis 264 of the radial-flow wheel, from a distance of a central axis 264, the distance being designated by rW. In particular, the radial-flow wheel includes a base 266 as well as a cover 268 directed toward the suction pipe or toward a compressor of an earlier stage. The radial-flow wheel includes a suction opening designated by r1 to suck in gas, this gas subsequently being laterally output by the radial-flow wheel, as is indicated at 270 in FIG. 6d.

When looking at FIG. 6c, the gas in the rotational direction before from the vane 262 has a higher relative speed, while it has a reduced speed behind from the vane 262. However, for high efficiency and a high efficiency factor it is preferred for the gas to be laterally ejected from the radial-flow wheel, i.e. at 270 in FIG. 6d, everywhere with as uniform a speed as possible. For this purpose, it is desirable to mount the vanes 262 as tightly as possible.

For technical reasons, however, it is not possible to mount vanes which extend from the inside, i.e. from the radius rW, to the outside as tightly as possible, since the suction opening having the radius r1 then will become more and more blocked.

It is therefore preferred, in accordance with the invention, to provide vanes 272 and 274 and 276, respectively, which extend over less than the length of vane 262. In particular, the vanes 272 do not extend from rW fully to the outside, but from R1 to the exterior with regard to the radial-flow wheel, R1 being larger than rW. By analogy therewith, as is depicted by way of example in FIG. 6c, vanes 274 only extend from R2 to the exterior, whereas vanes 276 extend only from R3 to the outside, R2 being larger than R1, and R3 being larger than R2.

These ratios are schematically depicted in FIG. 6d, a double hatching, for example within area 278 in FIG. 6d, indicating that there are two vanes in this area which overlap and are therefore marked by the double-hatched area. For example, the hatching from the bottom left to the top right, shown in area 278, designates a vane 262 extending from rW to the very outside, whereas the hatching extending from the top left to the bottom right in area 278 indicates a vane 272 which extends only from r1 to the outside in relation to the radial-flow wheel.

Thus, at least one vane is preferably arranged between two vanes extending further to the inside, said one vane not extending so far toward the inside. This results in that the suction area is not plugged, and/or that areas having a smaller radius are not too heavily populated with vanes, whereas areas having a larger radius are more densely populated with vanes, so that the speed distribution of the exiting gas which exists at the output of the radial-flow wheel, i.e. where the compressed gas leaves the radial-flow wheel, is as homogeneous as possible. With the inventive preferred radial-flow wheel in FIG. 6c, the speed distribution of the exiting gas is particularly homogeneous at the outer periphery, since the distance of vanes accelerating the gas and due to the "stacked" arrangement of the vanes is considerably smaller than in a case where, for example, only vanes 262 are present which extend from the very inside to the very outside, and thus necessarily have a very large distance at the outer end of the radial-flow wheel, the distance being considerably larger than in the inventive radial-flow wheel as is depicted in FIG. 6c.

It shall be noted at this point that the relatively expensive and complicated shape of the radial-flow wheel in FIG. 6c may be produced in a particularly favorable manner by plastic injection molding, it being possible, in particular, to simply achieve that all vanes, including the vanes which do not extend from the very inside to the very outside, i.e. vanes 272, 274, 276, are fixedly anchored, since they are connected both to the cover 268 and to the base 266 of FIG. 6d. The use of plastic in particular with the plastic injection molding technique enables production of any shapes desired in a precise manner and at low cost, which is not readily possible or is possible only at very high expense, or is possibly not even possible at all, with axial flow wheels made of metal.

It shall be noted at this point that very high numbers of revolutions of the radial-flow wheel are preferred, so that the acceleration acting upon the vanes takes on quite considerable values. For this reason it is preferred that particularly the shorter vanes 272, 274, 276 be fixedly connected not only to the base but also to the cover, such that the radial-flow wheel may readily withstand the accelerations occurring.

It shall also be noted in this context that the use of plastic is favorable also because of the superior impact strength of plastic. For example, it cannot be ruled out that ice crystals or water droplets will hit the radial-flow wheel at least of the first compressor stage. Due to the large accelerations, very large impact forces result here which plastics having sufficient impact strength readily withstand. In addition, the liquefaction within the liquefier preferably occurs on the basis of the cavitation principle. Here, small vapor bubbles collapse, on the basis of this principle, within a volume of water. From a microscopic point of view, quite considerable speeds and forces arise there which may lead to material fatigue in the long run, but which can be readily controlled when using a plastic having sufficient impact strength.

Figure 2:
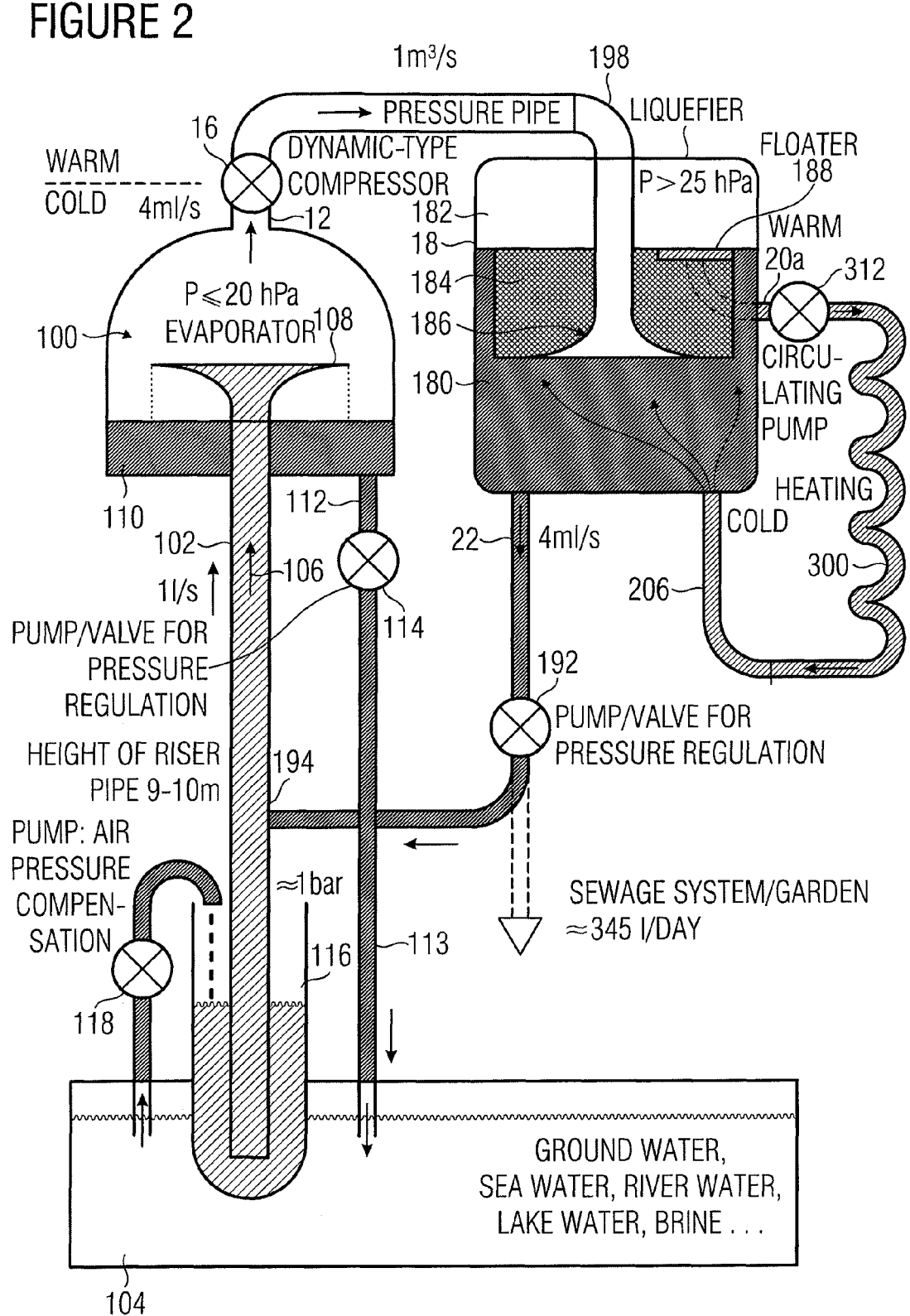
FIG. 2 is a block diagram of a preferred embodiment of the inventive heat pump operated with ground water, sea water, river water, lake water or brine.
Figure 3A:
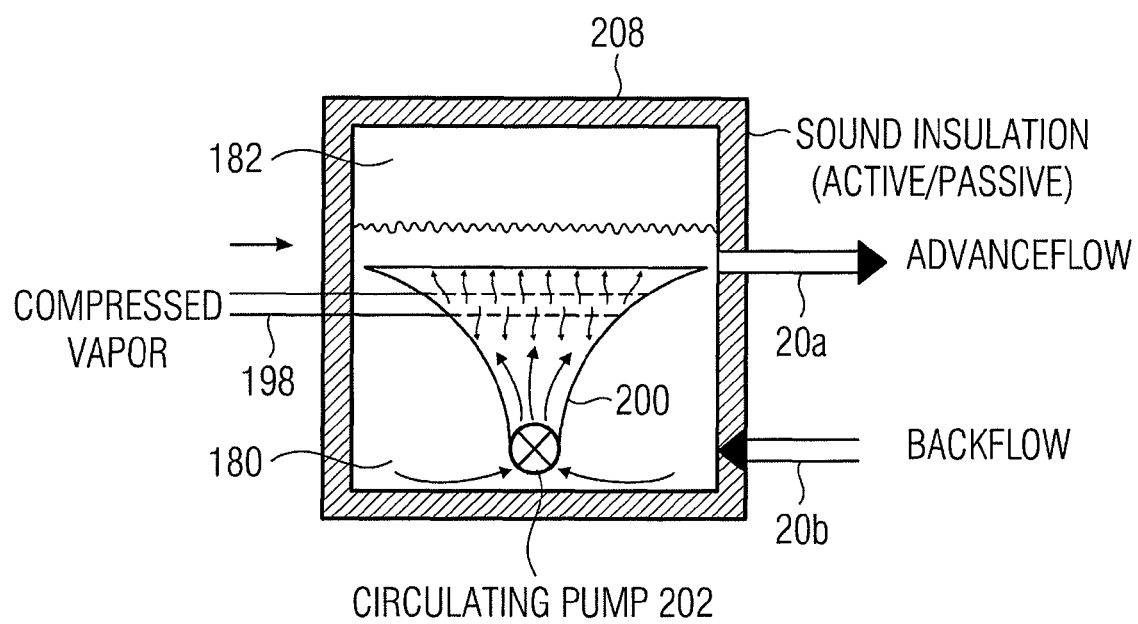
FIG. 3a is an alternative embodiment of the liquefier of FIG. 2.

The compressed gas output by the last compressor 174, i.e. the compressed water vapor, is then fed to the liquefier 18 which may be configured such as is depicted in FIG. 2, but which is preferably configured such as is shown in FIG. 3*a*. The liquefier 18 contains volume of water 180 and preferably a volume of steam 182 which may be as small as is desired. The liquefier 18 is configured to feed the compressed vapor into the water of the water volume 180, so that a condensation immediately results where the steam enters into the liquid, as is schematically drawn at 184. To this end, it is preferred for the gas supply to have an expansion area 186, such that the gas is distributed over as large an area as possible within the liquefier water volume 180. Typically, because of the temperature layers, the highest temperature within a water tank will be at the top, and the coolest temperature will be at the bottom. Therefore, the heating advance flow will be arranged, via a floater 188, as close to the surface of the water volume 180 as possible so as to extract the warmest water from the liquefier water volume 180. The heating backflow is fed to the liquefier at the bottom, so that the vapor to be liquefied comes in contact with water which is as cool as possible and which moves, due to the circulation using a heating circulating pump 312, again from the bottom in the direction of the steam-water border of the expander 186.

The embodiment in FIG. 2, wherein only a simple circulating pump 312 exists, is sufficient when the liquefier is arranged in a building such that the areas to be heated are located below the liquefier, so that, due to gravitation, all heating pipes have a pressure which is larger than that in the liquefier.

Figure 5B:
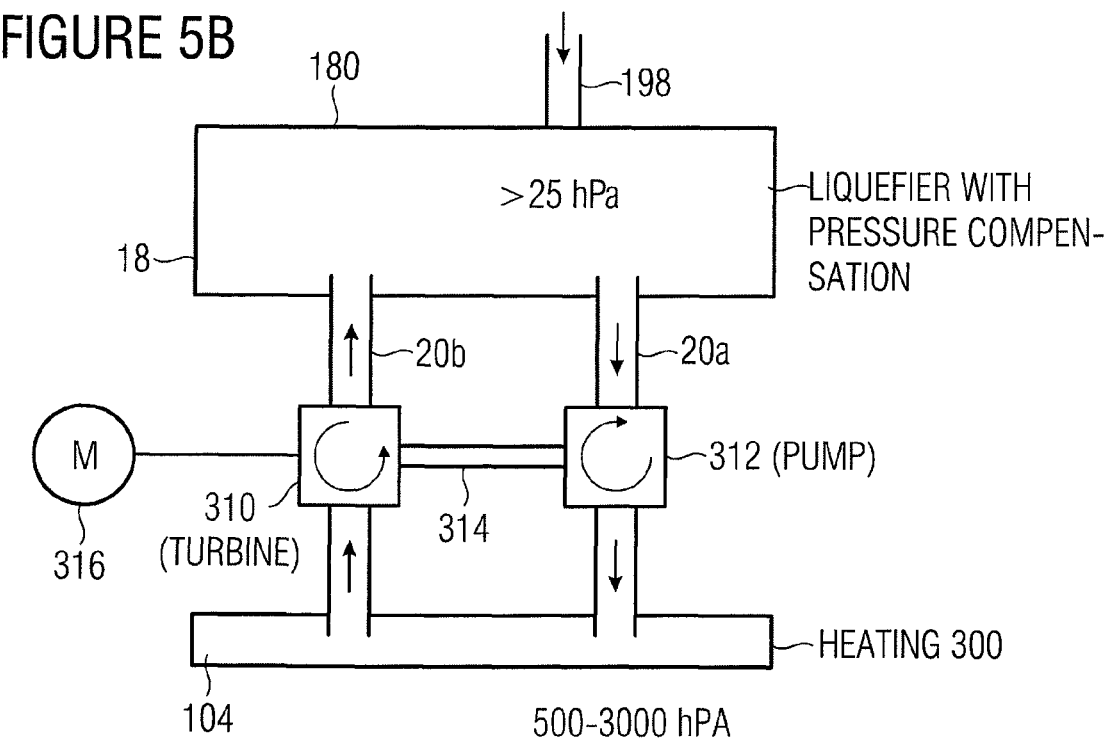
FIG. 5b is an implementation of an alternative realization of connecting a heating line to the liquefier with a turbine/pump combination.

By contrast, FIG. 5*b* shows an implementation of a connection of a heating line to the liquefier having a turbine/pump combination if the liquefier is to be arranged at a height lower than that of the heating line, or if a conventional heating which necessitates a higher pressure is to be connected. Thus, if the liquefier is to be arranged at a lower height, i.e. below an area to be heated, and/or below the heating line 300, the pump 312 will be configured as a driven pump as is shown at 312 in FIG. 5*b*. In addition, a turbine 310 will be provided within the heating backflow 20*b* for driving the pump 312, the turbine 310 being wired to the pump 312 via a force coupling 314. The high pressure will then be present within the heating system, and the low pressure will be present within the liquefier.

Since the water level within the liquefier would rise more and more due to the vapor being constantly introduced into the liquefier, the drain 22 is provided, via which, e.g., about 4 ml per second must also drain off for the water level within the liquefier to essentially not change. To this end, a drain pump, or a drain valve, 192 for pressure regulation is provided, such that without pressure loss, the necessary amount of, e.g., 4 ml per second, i.e. the quantity of water vapor which is fed to the liquefier while the compressor is running, is drained off again. Depending on the implementation, the drain may be introduced into the riser pipe as is shown at 194. Since all kinds of pressures between one bar and the pressure existing within the evaporation chamber are present along the riser pipe 102, it is preferred to feed in the drain 22 into the riser pipe at that location 194 where roughly the same pressure exists as it exists downstream from the pump 192, or valve 192. Then, no work has to be done to re-feed the drain water to the riser pipe.

In the embodiment shown in FIG. 2, one operates completely without any heat exchanger. The ground water is thus evaporated, the vapor is then liquefied within the liquefier, and the liquefied vapor is eventually pumped through the heating system and re-fed to the riser pipe. However, since only a (very small) part of, rather than all of, the quantity of water flowing through the riser pipe is evaporated, water which has flown through the floor heating system is thus fed to the ground water. If something like this is prohibited according to communal regulations, even though the present invention entails no contamination whatsoever, the drain may also be configured to feed the amount of 4 ml per second, which corresponds to roughly 345 l per day, to the sewage system. This would ensure that no medium which has been present within any heating system of any building is directly fed back into the ground water.

However, the backflow 112 from the evaporator may be fed to the ground water without any problems, since the water flowing back there only was in contact with the riser pipe and the return line, but has not exceeded the "evaporation boundary" between the evaporation expander 108 and the output to the dynamic-type compressor.

It shall be noted that in the embodiment shown in FIG. 2, the evaporation chamber as well as the liquefier, or the vapor chamber 182 of the liquefier, must be sealed off. As soon as the pressure within the evaporation chamber exceeds the mark necessary for the water being pumped through the riser pipe to evaporate, the heat pump process comes to a "standstill".

In the following, reference shall be made to FIG. 3*a* which represents a preferred embodiment of the liquefier 18. The feed line 198 for compressed vapor is positioned within the liquefier such that the vapor may exit into this water volume just below the surface of the liquefier water volume 180. For this purpose, the end of the vapor supply line comprises nozzles arranged around the circumference of the pipe, through which the vapor may exit into the water. For the mixing which occurs to be as thorough as possible, i.e. for the vapor to come into contact with water as cold as possible to liquefy as fast and efficiently as possible, an expander 200 is provided. This expansion is arranged within the liquefier water volume 180. At its narrowest point, it has a circulating pump 202 configured to suck in cold water at the bottom of the liquefier and to displace it, by means of the expander, toward a flow which is directed upward and becomes broader. This is intended to cause as large quantities as possible of the vapor entering into the liquefier water 180 to contact water which is provided by the circulating pump 202 and is as cold as possible.

In addition, it is preferred to provide, around the liquefier, a sound insulation 208 which may be configured in an active or a passive manner. A passive sound insulation will insulate the frequencies of the sound generated by the liquefaction as well as possible, similar to thermal insulation. It is equally preferred to subject the other components of the system to the sound insulation.

Alternatively, the sound insulation may also be configured to be active, in which case it would have, for example, a microphone for sound measurement, and would trigger, in response thereto, a sound countereffect, such as to cause an outer liquefier wall etc. to vibrate with, e.g., piezoelectric means.

The embodiment shown in FIG. 3a is somewhat problematic in that the liquid 180 located within the liquefier will enter into the pipe 198, within which otherwise a compressed vapor is present, when the heat pump is powered down. In one implementation, a backflow valve may be provided within line 198, for example near the output of the line from the liquefier. Alternatively, the line 198 may be directed upward, specifically so far upward that no liquid flows back into the compressor when the compressor is switched off. When the compressor is powered up again, the water from the vapor line 198 will initially be pressed into the liquefier by the compressed vapor.

Not until a sufficient portion of the water has been removed from the line 198 will a vapor be made to condensate within the liquefier. An embodiment of such a type thus has a certain delay time which is necessary until the water volume 180 is heated up again by the compressed vapor. In addition, the work necessary for removing the water which has entered into the line 198 from the line 198 again is no longer retrievable and is thus "lost" with regard to the heating system, such that small-scale losses in terms of the efficiency factor must be accepted.

Figure 3B:
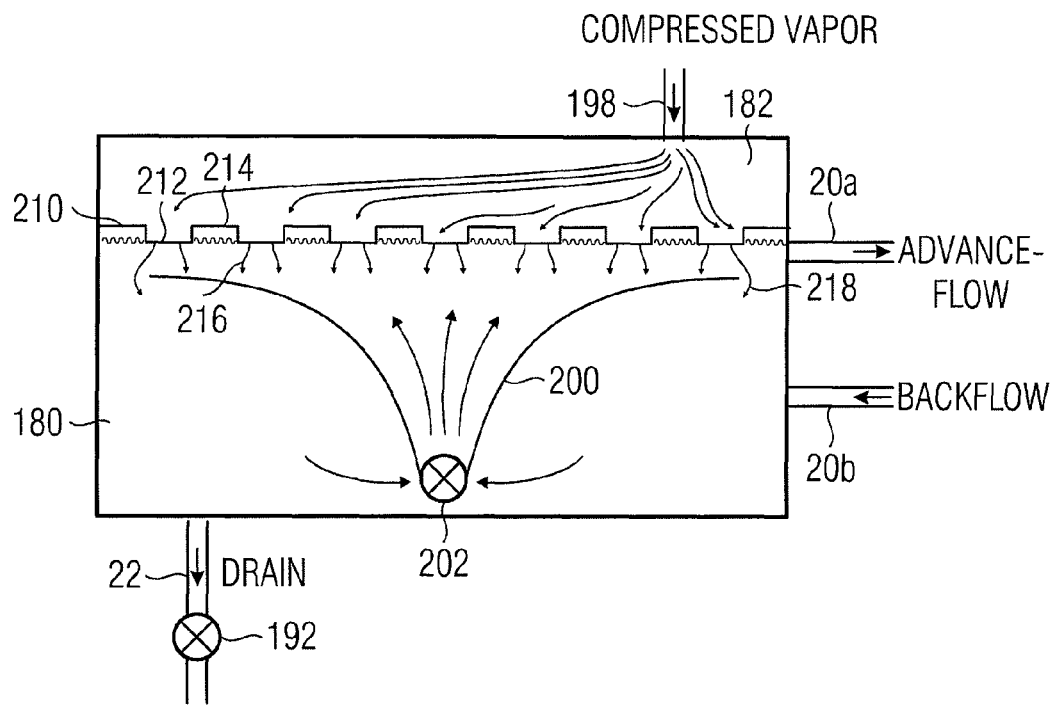
FIG. 3b is an alternative embodiment of the liquefier with a reduced backflow in the off operation.

An alternative embodiment which overcomes this problem is shown in FIG. 3b. Unlike in FIG. 3a, the compressed vapor is now not fed within a pipe below the water level within the liquefier. Instead, the vapor is "pumped", as it were, into the liquid within the liquefier from the surface. For this purpose, the liquefier includes a nozzle plate 210 comprising nozzles 212 which project in relation to the plane of the nozzle plate 210. The nozzles 212 extend below the water level of the water volume 180 in the liquefier. The recessed portions between two nozzles, shown at 214 in FIG. 3b, by contrast extend above the water level of the water volume 180 within the liquefier, so that the water surface of the liquefier water, the water surface being interrupted by a nozzle, is located between two nozzles. The nozzle 212 has nozzle openings through which the compressed vapor which spreads from the line 198 within the vapor volume 182 may enter into the liquefier water, as is schematically shown by arrows 216.

If, in the implementation of FIG. 3b, the compressor is powered down, this will result in that the liquid enters into the nozzles 212 of the nozzle plate 210 to a small extent only, so that very little work must be done in order to press the water out from the nozzles again when the heat pump is powered up again. At any rate, the expander 200 ensures that, due to being fed through the expander, the liquid transported upward by the pump 202 is as cold as possible and comes into contact with the warm vapor. Then the warm water will either immediately enter into the advance flow 20a, or it will spread within the water volume over the expander edge, as is depicted by an arrow 218, so that a temperature stratification which is disturbed to as small an extent as possible, in particular because of the shape of the expander, will occur within the liquefier outside the expander.

The flow rate present at the edge of the expander, i.e. where arrow 218 is indicated, is considerably lower than in the center. It is preferred to operate the liquefier as a temperature layer storage such that the heat pump and, in particular, the compressor need not run without interruption, but must run only when there is a need, as is also the case for normal heating installations operating, for example, with an oil burner.

Figure 3C:
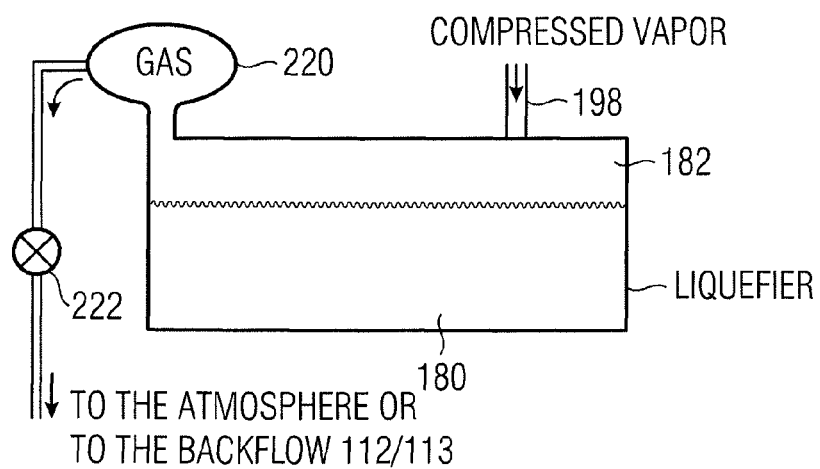
FIG. 3c is a schematic representation of the liquefier having a gas separator.

FIG. 3c shows a further preferred implementation of the liquefier in a schematic form. In particular, the liquefier comprises a gas separator 220 coupled to the gas volume 182 within the liquefier. Any gas arising within the liquefier, such as oxygen or another gas which may leak within the liquefier, collects within the gas-separator container 220. By actuating a pump 222, preferably at certain intervals, since permanent gas evacuation is not necessary due to the small quantity of gas developing, this gas may then be pumped into the atmosphere. Alternatively, the gas may also be docked into the backflow 112 or 113 of FIG. 2 again, so that the gas is again brought back into the ground water reservoir, along with the ground water flowing back, where it will again be dissolved within the ground water, or will merge into the atmosphere when it enters into the ground water reservoir.

Since the inventive system operates with water, no gases will develop, even with a high gas leakage, which have not already been dissolved within the ground water previously, so that the gas separated off entails no environmental problems whatsoever. It shall again be emphasized that, due to the inventive dynamic-type compressor compression and due to the use of water as the working fluid, there will be no contamination or soiling by synthetic coolants or by oil, due to an oil cycle, at any point. As the working medium, the inventive system at any point has water or vapor, which is at least as clean as the original ground water, or is even cleaner than the ground water due to the evaporation within the evaporator, since the water is distilled water once the compressed vapor has been liquefied again within the liquefier.

Figure 4A:
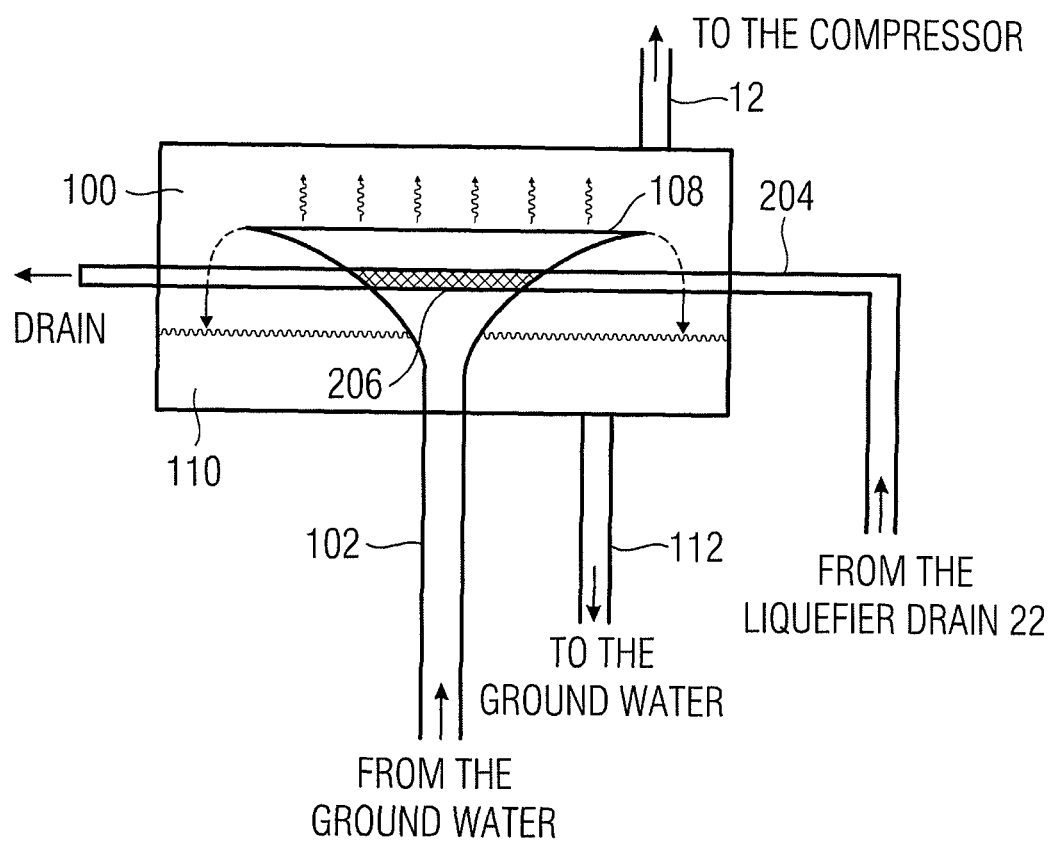
FIG. 4a is a preferred implementation of the evaporator of FIG. 2.

In the following, a preferred embodiment of the evaporator will be depicted with reference to FIG. 4a so as to advantageously employ the liquefier drain to accelerate the evaporation process. For this purpose, the drain, which, as one knows, has the temperature of the heating system backflow, i.e. has a much higher temperature than the ground water pumped from the earth, is passed through the expander 108 of the evaporator, so that the wall of the drain pipe 204 acts as a nucleus for nucleate boiling. Thus, a substantially more efficient vapor is generated by the evaporator than if no such nucleating action were provided. In addition, it is preferred to configure the wall of the drain pipe 204, at least within the expander, to be as structured as possible, as is depicted at 206, to improve the nucleation for the nucleate boiling even more. The rougher the surface of the drain pipe 204, the more nuclei will be generated for nucleate boiling. It shall be noted that the flow through the drain pipe 22 is only very low, since what is dealt with here is only the 4 ml per second which are fed to the liquefier in one mode of operation. Nevertheless, the considerably more efficient nucleate boiling may be caused already with this small amount and because of the temperature, which is relatively high as compared to the ground water, so as to reduce the size of the evaporator while maintaining the efficiency of the heat pump.

To accelerate the evaporation process, alternatively or additionally, an area of the evaporator which has water which is to be evaporated located thereon, i.e. the surface of the expander or a part thereof, may be configured from a rough material to provide nuclei for nucleate boiling. Alternatively or additionally, a rough grate may also be arranged (close to) below the water surface of the water to be evaporated.

Figure 4B:
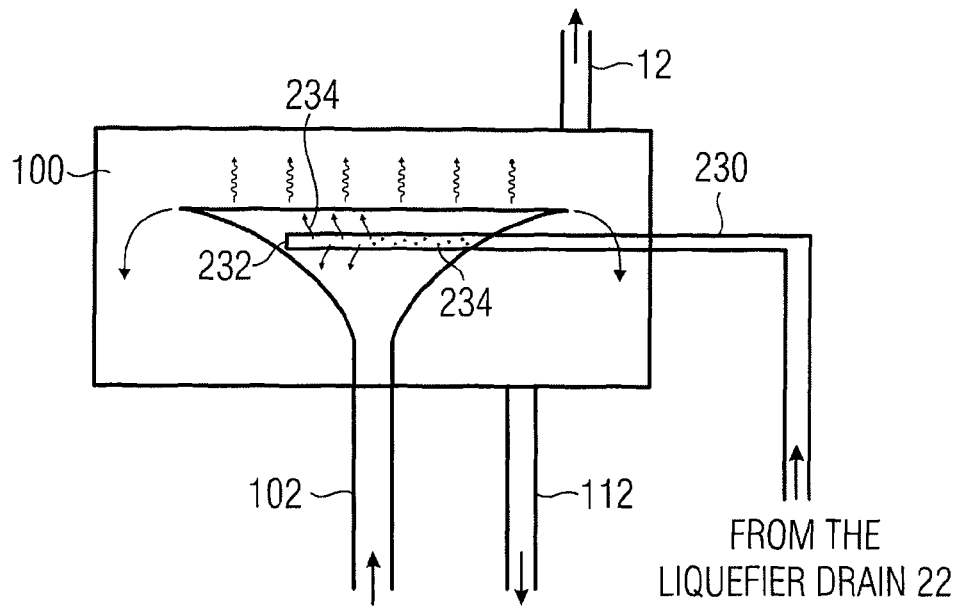
FIG. 4b is an alternative embodiment of the evaporator using the liquefier drain as a boiling assistance.

FIG. 4b shows an alternative implementation of the evaporator. While the drain in FIG. 4a has been employed merely as a "flow-through" assistance of the nucleate formation for efficient evaporation, and, as has been depicted on the left-hand side in the picture in FIG. 4a, the drain is drained off once it has passed through the evaporator, the drain in FIG. 4b is itself used for reinforcing the nucleate formation. For this purpose, the liquefier drain 22 of FIG. 2 is connected to a nozzle pipe 230, possibly via a pump 192 or, if conditions permit, without a pump, the nozzle pipe 230 having a seal 232 on one end and having nozzle openings 234. The warm liquefier water drained from the liquefier via drain 22 at a rate of, for example, 4 ml per second is now fed into the evaporator. On its way to a nozzle opening 234 within the nozzle pipe 230, or immediately at the exit of a nozzle, it will already evaporate, as it were, below the water surface of the evaporator water because of the pressure which is too low for the temperature of the drain water.

The vapor bubbles forming there will immediately act as boiling nuclei for the evaporator water which is pumped via the inflow 102. Thus, efficient nucleate boiling may be triggered within the evaporator without any major additional measures being taken, this triggering existing, similar to FIG. 4a, because of the fact that the temperature near the rough area 206 in FIG. 4a or near a nozzle opening 234 is already so high that, given the existing pressure, evaporation will immediately take place. This evaporation forces the generation of a small vapor bubble which, if the conditions are favorably selected, will have a very high probability of not collapsing again, but of developing into a vapor bubble which goes to the surface and which, once it has entered into the vapor volume within the evaporation chamber, will be sucked off by the compressor via the suction pipe 12.

The embodiment shown in FIG. 4b necessitates the liquefier water to be brought into the ground water cycle, since the medium exiting the nozzle pipe 230 eventually will re-enter into the backflow 112 via the overflow of the evaporator, and will thus be made to contact the ground water.

Figure 4C:
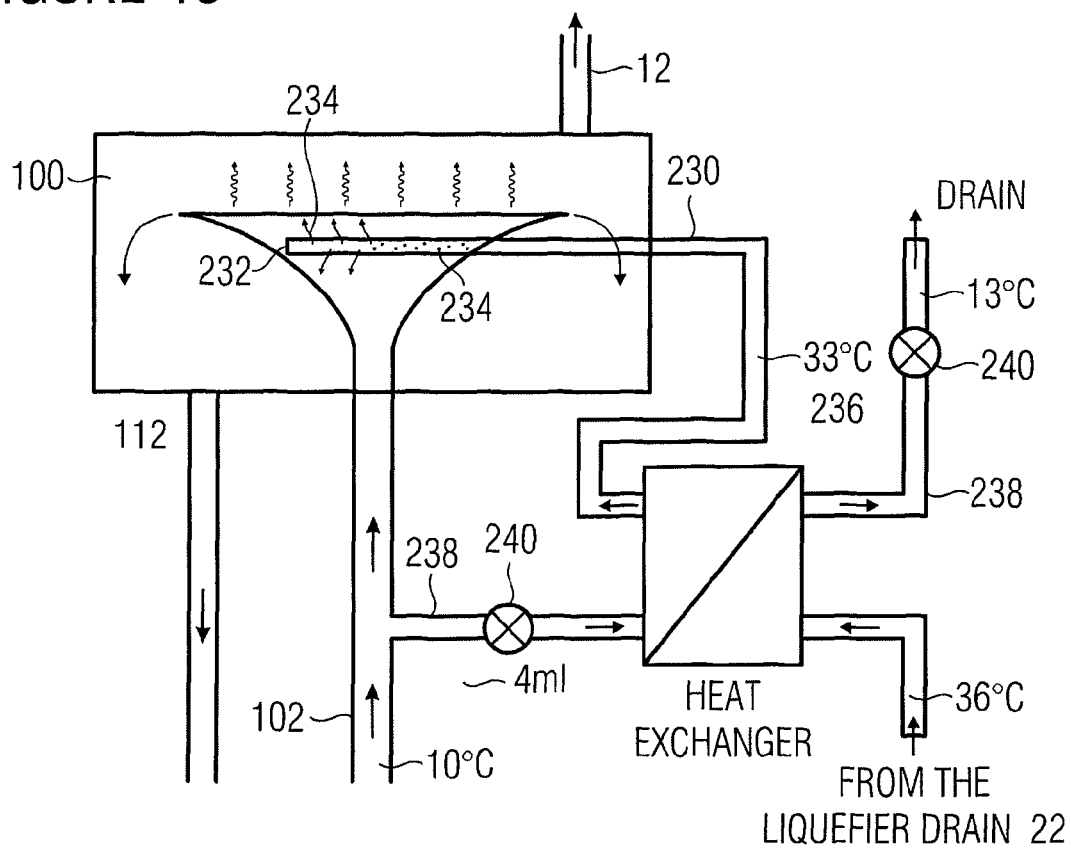
FIG. 4c is an alternative embodiment of the evaporator having a heat exchanger for using ground water for boiling assistance.

If there are water-regulatory provisions or any other reasons why this is not admissible, the embodiment shown in FIG. 4c may be employed. The warm liquefier water provided by the liquefier drain 22 is introduced into a heat exchanger 236 at a rate of, e.g., 4 ml per second to give off its heat to ground water which has been branched off from the main ground water stream within line 102 via a branch line 238 and a branching-off pump 240. The branched-off ground water will then essentially take on the heat of the liquefier drain within the heat exchanger 236, so that pre-heated ground water is introduced into the nozzle pipe 230, for example at a temperature of 33° C. so as to effectively trigger or support the nucleate boiling within the evaporator by means of the temperature which is high compared to the ground water. On the other hand, the heat exchanger provides, via a drain line 238, drain water which is cooled to a relatively high extent and which is then fed to the sewage system via a drain pump 240. On the basis of the combination of the branch line 238 and the branching-off pump 240 and the heat exchanger 236, only ground water is used in, or introduced into, the evaporator without said ground water having been in contact with any other medium. Thus, there is no water-regulatory relevance associated with the embodiment shown in FIG. 4c.

Figure 4D:
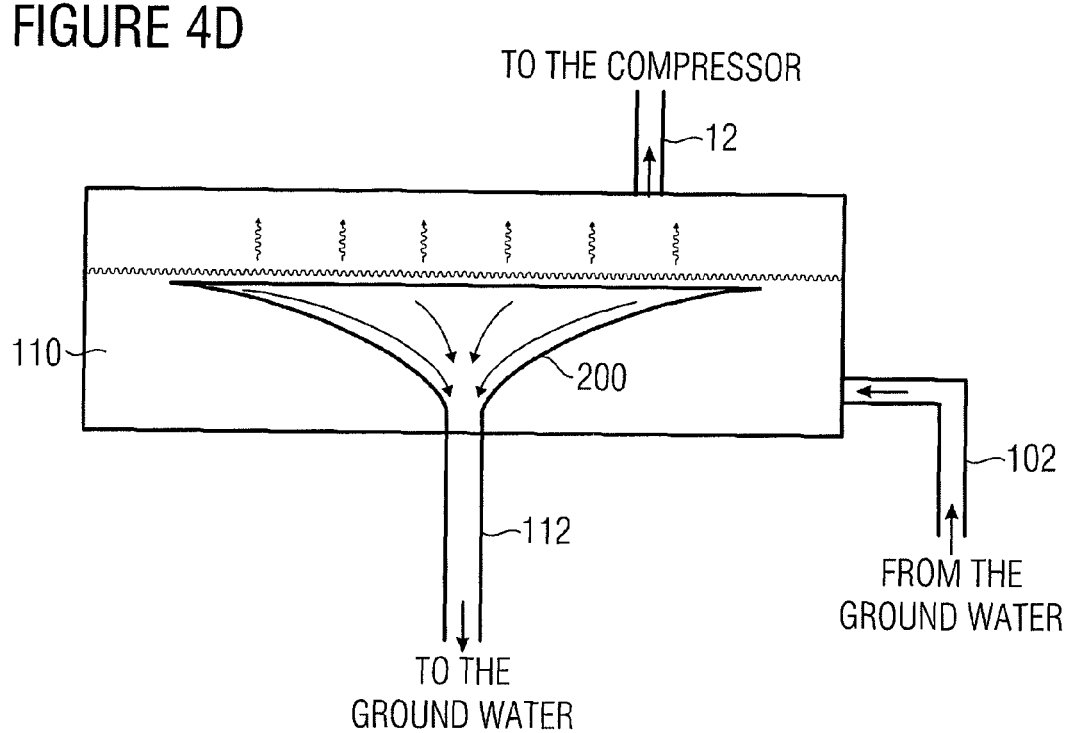
FIG. 4d is an alternative embodiment of the evaporator comprising feeding from the side and draining in the center.

FIG. 4d shows an alternative implementation of the evaporator with edge feeding. Unlike in FIG. 2, here the expander 200 of the evaporator is arranged below the water level 110 within the evaporator. This causes water to flow toward the center of the expander "from outside" so as to be returned in a central line 112. While the central line in FIG. 2 has served to feed the evaporator, in FIG. 4d it now serves to drain off the non-evaporated ground water. By contrast, the line 112 shown in FIG. 2 has served to drain off non-evaporated ground water. In FIG. 4d, by contrast, this line at the edge serves as a ground water feed.

Figure 4E:
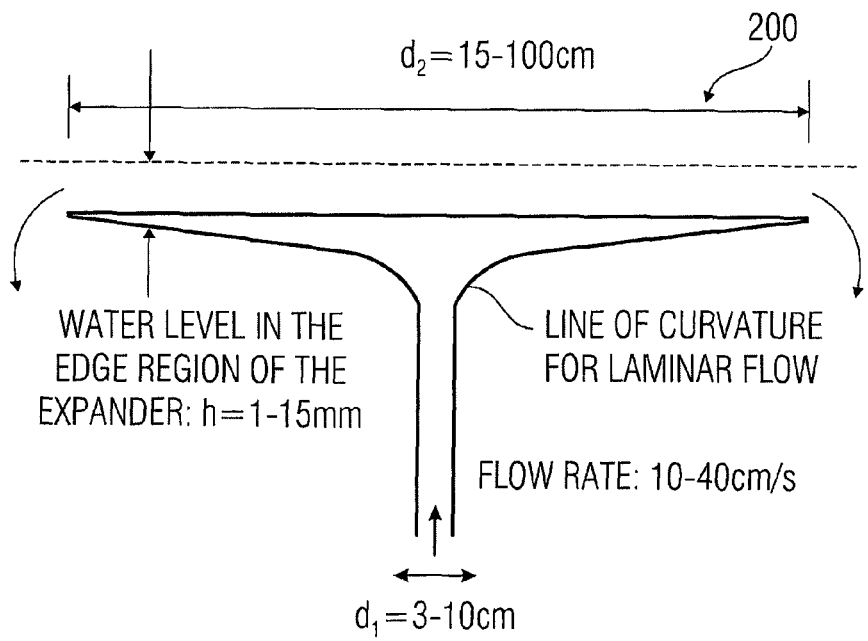
FIG. 4e is a schematic representation of the expander with an indication of preferred measurements.

FIG. 4e shows a preferred implementation of the expander 200 as may be employed within the evaporator, or of the expander as may also be employed, e.g., within the liquefier and as is shown, for example, in FIG. 2 or FIG. 3a or 3b, respectively. The expander is preferably configured such that its small diameter preferably enters into the expander in the center of the "large" expander area. This diameter of this inflow or drain (in FIG. 4d) preferably ranges between 3 and 10 cm and, in particularly preferred embodiments, between 4 and 6 cm.

The large diameter d2 of the expander ranges between 15 and 100 cm in preferred embodiments, and is smaller than 25 cm in particularly preferred embodiments. The small configuration of the evaporator is possible if efficient measures for triggering and assisting nucleate boiling are employed, as has been explained above. The small radius d1 and the large radius d2 have an area of curvature of the expander located between them which is preferably configured such that within this area a laminar flow results which is decreased from a fast flow rate, preferably within the range from 7 to 40 cm per second, to a relatively small flow rate at the edge of the expander. Large discontinuities of the flow rate, for example eddies within the area of the line of curvature, or "bubbling effects" above the inflow, if the expander is viewed from the top, are preferably avoided since they may possibly have a negative effect on the efficiency factor.

In particularly preferred embodiments, the expander has a shape which results in that the height of the water level above the expander surface is smaller than 15 mm and is preferably between 1 and 5 mm. It is therefore preferred to employ an expander 200 configured such that in more than 50% of the area of the expander, when viewed from the top, a water level exists which is smaller than 15 mm. Thus, efficient evaporation may be ensured across the entire area which is even increased, it terms of its efficiency, when measures for triggering nucleate boiling are used.

Thus, the inventive heat pump serves to efficiently supply buildings with heat, and it no longer necessitates any working substance which negatively affects the world climate. In accordance with the invention, water is evaporated under very low pressure, is compressed by one or several dynamic-type compressors arranged one behind the other, and is again liquefied into water. The transported energy is used for heating. In accordance with the invention, use is made of a heat pump which preferably represents an open system. Here, open system means that ground water or any other available aqueous medium carrying heat energy is evaporated, compressed and liquefied under low pressure. The water is directly used as the working substance. Thus, the energy contained is not transmitted to a closed system. The liquefied water is preferably used directly within the heating system and is subsequently supplied back to the ground water. To capacitively decouple the heating system, it may also be terminated by a heat exchanger.

The efficiency and usefulness of the present invention is represented by means of a numerical example. If one assumes an annual heating requirement of 30,000 kWh, in accordance with the invention about maximally 3,750 kWh of electrical current must be expended for operating the dynamic-type compressor to achieve this, since the dynamic-type compressor need only provide about an eighth of the entire amount of heat necessary.

The eighth results from the fact that a sixth needs to be expended in the event of extreme cold only, and that, for example, at transition temperatures such as in March or at the end of October, the efficiency factor may rise to a value of more than 12, so that, on average, a maximum of one eighth must be expended over the year.

At electricity prices of about 10 eurocents per kWh, which may be arrived at for electricity if one buys electricity for which the power station need not guarantee that operation will be free from interruptions, this roughly corresponds to annual costs of 375 euros. If one wants to generate 30,000 kWh using oil, one would need about 4,000 l, which would correspond to a price of 2,800 euros on the basis of current oil prices, which are very unlikely to fall in the future. In accordance with the invention, one can therefore save 2,425 euros per annum! In addition, it shall also be pointed out that in comparison with burning oil or gas for heating purposes, up to 70% of the amount of $CO_2$ released is saved by means of the inventive concept.

To reduce the manufacturing cost and also to reduce the maintenance and assembly costs, it is preferred to configure the housings of the evaporator, of the compressor and/or of the liquefier and also, particularly, the radial-flow wheel of the dynamic-type compressor, from plastic, and in particular from injection molding plastic. Plastic is well suited since plastic is corrosion-resistant with regard to water, and since, in accordance with the invention, the maximum temperatures are preferably clearly below the deformation temperatures of employable plastics compared to conventional heating systems. In addition, assembly is particularly simple since negative pressure is present within the system consisting of evaporator, compressor and liquefier. Thus, substantially fewer requirements are placed on the sealings since the entire atmospheric pressure assists in keeping the housings leak-proof. Also, plastic is particularly well suited since at no location in the inventive system are there high temperatures which would necessitate the use of expensive special plastics, metal or ceramic. By means of plastic injection molding, the shape of the radial-flow wheel may also be optimized in any manner desired while being manufactured in a simple manner and at low cost despite its complicated shape.

Depending on the circumstances, the inventive method may be implemented in hardware or in software. Implementation can be on a digital storage medium, in particular a disk or CD, with electronically readable control signals which may interact with a programmable computer system such that the respective method is performed. Generally, the invention thus also consists in a computer program product with a program code, stored on a machine-readable carrier, for performing the inventive method when the computer program product runs on a computer. In other words, the invention may thus be realized as a computer program having a program code for performing the method when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A heat pump comprising:
    an evaporator for evaporating water as a working liquid to generate a working vapor, the evaporator comprising an evaporation chamber and being adapted to generate an evaporation pressure of less than 20 hPa within the evaporation chamber, so that the water will evaporate at temperatures below 18° C.;
    a dynamic-type compressor coupled to the evaporator for compressing the working vapor, the compressor being adapted adapted to compress the working vapor to a working pressure of more than 5 hPa above the evaporation pressure; and
    a liquefier for liquefying a compressed working vapor, the liquefier being adapted to output a heat which has been acquired during the liquefaction to a heating system,
    wherein the liquefier comprises a drain to drain off liquefied working liquid, and
    wherein the drain comprises a nozzle pipe having a seal arranged within the evaporator, wherein the nozzle pipe creates a bubble evaporation within the evaporator.

2. The heat pump as claimed in claim 1, wherein the nozzle pipe further comprises nozzle openings, wherein the nozzle openings create the bubble evaporation within the evaporator.

3. A heat pump comprising: an evaporator for evaporating water as a working liquid to generate a working vapor, the evaporator comprising an evaporation chamber and being adapted to generate an evaporation pressure of less than 20 hPa within the evaporation chamber, so that the water will evaporate at temperatures below 18° C.; a dynamic-type compressor coupled to the evaporator for compressing the working vapor, the compressor being adapted to compress the working vapor to a working pressure of more than 5 hPa above the evaporation pressure; and a liquefier for liquefying a compressed working vapor, the liquefier being adapted to output a heat which has been acquired during the liquefaction to a heating system, wherein the liquefier comprises a drain to drain off liquefied working liquid, and wherein the drain comprises a nozzle pipe which comprises nozzle openings to feed a working fluid located within the nozzle pipe into water which is to be evaporated and is located within the evaporator, so as to provide a nucleating effect for a bubble evaporation within the evaporator.

* * * * *